(12) United States Patent
Pedlow, Jr. et al.

(10) Patent No.: US 7,346,163 B2
(45) Date of Patent: Mar. 18, 2008

(54) DYNAMIC COMPOSITION OF PRE-ENCRYPTED VIDEO ON DEMAND CONTENT

(75) Inventors: Leo M. Pedlow, Jr., Ramona, CA (US); Davender Agnihotri, Murrieta, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 238 days.

(21) Appl. No.: 10/802,007

(22) Filed: Mar. 16, 2004

(65) Prior Publication Data

US 2005/0094808 A1    May 5, 2005

Related U.S. Application Data

(60) Provisional application No. 60/516,050, filed on Oct. 31, 2003.

(51) Int. Cl.
  *H04N 7/167* (2006.01)
  *H04L 9/00* (2006.01)
  *H04K 1/00* (2006.01)
  *G06F 11/30* (2006.01)

(52) U.S. Cl. ............... 380/210; 380/211; 380/212; 380/233; 380/240; 380/242; 380/37; 380/200; 380/239; 713/176; 713/160; 713/153; 713/162

(58) Field of Classification Search ........ 380/210, 380/211, 212, 233, 240, 242, 37, 200, 239; 713/153, 160, 162, 176

See application file for complete search history.

(56) References Cited

U.S. PATENT DOCUMENTS 3,852,519 A    12/1974  Court (Continued)

FOREIGN PATENT DOCUMENTS

EP    0471373    2/1992

(Continued)

OTHER PUBLICATIONS

U.S. Appl. No. 10/038,217, filed Jan. 2, 2002, Critical Packet Partial Encryption.

(Continued)

*Primary Examiner*—Christopher Revak
*Assistant Examiner*—Shin-Hon Chen
(74) *Attorney, Agent, or Firm*—Miller Patent Services; Jerry A. Miller

(57) ABSTRACT

According to certain embodiments consistent with the present invention, a method of processing digital video content, wherein the digital video content comprises intra-coded frames and inter-coded frames, involves selecting a plurality of the intra-coded frames for encryption to produce selected frames; encrypting the selected frames under a first encryption algorithm to produce first encrypted frames; storing the inter-coded frames in a first file; and storing the intra-coded frames, whether encrypted under the first encryption algorithm or unencrypted, in a second file. For a multiple encryption embodiment consistent with the present invention, the method further involves duplicating the intra-coded frames; encrypting duplicates of the selected frames under a second encryption algorithm to produce second encrypted frames; storing the intra-coded frames, whether encrypted under the second encryption algorithm or unencrypted, in a third file. This abstract is not to be considered limiting, since other embodiments may deviate from the features described in this abstract.

8 Claims, 10 Drawing Sheets

U.S. PATENT DOCUMENTS

| | | |
|---|---|---|
| 4,381,519 A | 4/1983 | Wilkinson et al. |
| 4,419,693 A | 12/1983 | Wilkinson |
| 4,521,853 A | 6/1985 | Guttag |
| 4,634,808 A | 1/1987 | Moerder |
| 4,700,387 A | 10/1987 | Hirata |
| 4,703,351 A | 10/1987 | Kondo |
| 4,703,352 A | 10/1987 | Kondo |
| 4,710,811 A | 12/1987 | Kondo |
| 4,712,238 A | 12/1987 | Gilhousen et al. |
| 4,722,003 A | 1/1988 | Kondo |
| 4,739,510 A | 4/1988 | Jeffers et al. |
| 4,772,947 A | 9/1988 | Kono |
| 4,785,361 A | 11/1988 | Brotby |
| 4,788,589 A | 11/1988 | Kondo |
| 4,815,078 A | 3/1989 | Shimura |
| 4,845,560 A | 7/1989 | Kondo et al. |
| 4,887,296 A | 12/1989 | Horne |
| 4,890,161 A | 12/1989 | Kondo |
| 4,914,515 A | 4/1990 | Van Luyt |
| 4,924,310 A | 5/1990 | von Brandt |
| 4,944,006 A | 7/1990 | Citta et al. |
| 4,953,023 A | 8/1990 | Kondo |
| 4,989,245 A | 1/1991 | Bennett |
| 4,995,080 A | 2/1991 | Bestler et al. |
| 5,018,197 A | 5/1991 | Jones et al. |
| 5,023,710 A | 6/1991 | Kondo et al. |
| 5,091,936 A | 2/1992 | Katznelson |
| 5,122,873 A | 6/1992 | Golin |
| 5,138,659 A | 8/1992 | Kelkar et al. |
| 5,142,537 A | 8/1992 | Kutner et al. |
| 5,144,662 A | 9/1992 | Welmer |
| 5,144,664 A | 9/1992 | Esserman et al. |
| 5,151,782 A | 9/1992 | Ferraro |
| 5,159,452 A | 10/1992 | Kinoshita et al. |
| 5,196,931 A | 3/1993 | Kondo |
| 5,208,816 A | 5/1993 | Seshardi et al. |
| 5,237,424 A | 8/1993 | Nishino et al. |
| 5,237,610 A | 8/1993 | Gammie et al. |
| 5,241,381 A | 8/1993 | Kondo |
| 5,247,575 A | 9/1993 | Sprague et al. |
| 5,258,835 A | 11/1993 | Kato |
| 5,319,707 A | 6/1994 | Wasilewski et al. |
| 5,319,712 A | 6/1994 | Finkelstein et al. |
| 5,325,432 A | 6/1994 | Gardeck et al. |
| 5,327,502 A | 7/1994 | Katata |
| 5,341,425 A | 8/1994 | Wasilewski et al. |
| 5,359,694 A | 10/1994 | Concordel |
| 5,379,072 A | 1/1995 | Kondo |
| 5,381,481 A | 1/1995 | Gammie et al. |
| 5,398,078 A | 3/1995 | Masuda et al. |
| 5,400,401 A | 3/1995 | Wasilewski et al. |
| 5,414,852 A | 5/1995 | Kramer et al. |
| 5,416,651 A | 5/1995 | Uetake et al. |
| 5,416,847 A | 5/1995 | Boze |
| 5,420,866 A | 5/1995 | Wasilewski |
| 5,428,403 A | 6/1995 | Andrew et al. |
| 5,434,716 A | 7/1995 | Sugiyama et al. |
| 5,438,369 A | 8/1995 | Citta et al. |
| 5,444,491 A | 8/1995 | Lim |
| 5,444,782 A | 8/1995 | Adams, Jr. et al. |
| 5,455,862 A | 10/1995 | Hoskinson |
| 5,469,216 A | 11/1995 | Takahashi et al. |
| 5,471,501 A | 11/1995 | Parr et al. |
| 5,473,692 A | 12/1995 | Davis |
| 5,481,554 A | 1/1996 | Kondo |
| 5,481,627 A | 1/1996 | Kim |
| 5,485,577 A | 1/1996 | Eyer et al. |
| 5,491,748 A | 2/1996 | Auld, Jr. et al. |
| 5,526,427 A | 6/1996 | Thomas et al. |
| 5,528,608 A | 6/1996 | Shimizume |
| 5,535,276 A | 7/1996 | Ganesan |
| 5,539,823 A | 7/1996 | Martin |
| 5,539,828 A | 7/1996 | Davis |
| 5,553,141 A | 9/1996 | Lowry et al. |
| 5,555,305 A | 9/1996 | Robinson et al. |
| 5,561,713 A | 10/1996 | Suh |
| 5,568,552 A | 10/1996 | Davis |
| 5,574,787 A | 11/1996 | Ryan |
| 5,582,470 A | 12/1996 | Yu |
| 5,583,576 A | 12/1996 | Perlman et al. |
| 5,583,863 A | 12/1996 | Darr, Jr. et al. |
| 5,590,202 A | 12/1996 | Bestler et al. |
| 5,598,214 A | 1/1997 | Kondo et al. |
| 5,600,721 A | 2/1997 | Kitazato |
| 5,606,359 A | 2/1997 | Youden et al. |
| 5,608,448 A | 3/1997 | Smoral et al. |
| 5,615,265 A | 3/1997 | Coutrot |
| 5,617,333 A | 4/1997 | Oyamada et al. |
| 5,625,715 A | 4/1997 | Trew et al. |
| 5,629,981 A | 5/1997 | Nerlikar |
| 5,652,795 A | 7/1997 | Eillon et al. |
| 5,663,764 A | 9/1997 | Kondo et al. |
| 5,666,293 A | 9/1997 | Metz et al. |
| 5,696,906 A | 12/1997 | Peters et al. |
| 5,699,429 A | 12/1997 | Tamer et al. |
| 5,703,889 A | 12/1997 | Shimoda et al. |
| 5,717,814 A | 2/1998 | Abecassis |
| 5,726,702 A | 3/1998 | Hamaguchi et al. |
| 5,726,711 A | 3/1998 | Boyce |
| 5,732,346 A | 3/1998 | Lazaridis et al. |
| 5,742,680 A | 4/1998 | Wilson |
| 5,742,681 A | 4/1998 | Giachettie et al. |
| 5,751,280 A | 5/1998 | Abbott et al. |
| 5,751,743 A | 5/1998 | Takizawa |
| 5,751,813 A | 5/1998 | Dorenbos |
| 5,754,650 A | 5/1998 | Katznelson |
| 5,754,658 A | 5/1998 | Aucsmith |
| 5,757,417 A | 5/1998 | Aras et al. |
| 5,757,909 A | 5/1998 | Park |
| 5,768,539 A | 6/1998 | Metz et al. |
| 5,796,786 A | 8/1998 | Lee |
| 5,796,829 A | 8/1998 | Newby et al. |
| 5,796,840 A | 8/1998 | Davis |
| 5,802,176 A | 9/1998 | Audebert |
| 5,805,700 A * | 9/1998 | Nardone et al. ............ 380/217 |
| 5,805,712 A | 9/1998 | Davis |
| 5,805,762 A | 9/1998 | Boyce et al. |
| 5,809,147 A | 9/1998 | De Lange et al. |
| 5,815,146 A | 9/1998 | Youden et al. |
| 5,818,934 A | 10/1998 | Cuccia |
| 5,825,879 A | 10/1998 | Davis |
| 5,850,218 A | 12/1998 | LaJoie et al. |
| 5,852,290 A | 12/1998 | Chaney |
| 5,852,470 A | 12/1998 | Kondo et al. |
| 5,870,474 A | 2/1999 | Wasiliewski et al. |
| 5,894,320 A | 4/1999 | Vancelette |
| 5,894,516 A | 4/1999 | Brandenburg |
| 5,915,018 A | 6/1999 | Aucsmith |
| 5,917,830 A | 6/1999 | Chen et al. |
| 5,922,048 A | 7/1999 | Emura |
| 5,923,755 A | 7/1999 | Birch et al. |
| 5,930,361 A | 7/1999 | Hayashi et al. |
| 5,933,500 A | 8/1999 | Blatter et al. |
| 5,940,738 A | 8/1999 | Rao |
| 5,949,877 A | 9/1999 | Traw et al. |
| 5,949,881 A | 9/1999 | Davis |
| 5,963,909 A | 10/1999 | Warren et al. |
| 5,973,679 A | 10/1999 | Abbott et al. |
| 5,973,722 A | 10/1999 | Wakai et al. |
| 5,973,726 A | 10/1999 | Iijima et al. |
| 5,999,622 A | 12/1999 | Yasukawa et al. |
| 5,999,698 A | 12/1999 | Nakai et al. |
| 6,005,561 A | 12/1999 | Hawkins et al. |
| 6,011,849 A | 1/2000 | Orrin |

| Patent | Kind | Date | Inventor |
|---|---|---|---|
| 6,012,144 | A | 1/2000 | Pickett |
| 6,016,348 | A | 1/2000 | Blatter et al. |
| 6,021,199 | A | 2/2000 | Ishibashi |
| 6,021,201 | A | 2/2000 | Bakhle et al. |
| 6,026,164 | A | 2/2000 | Sakamoto et al. |
| 6,028,932 | A | 2/2000 | Park |
| 6,049,613 | A | 4/2000 | Jakobsson |
| 6,055,314 | A | 4/2000 | Spies et al. |
| 6,055,315 | A | 4/2000 | Doyle et al. |
| 6,057,872 | A | 5/2000 | Candelore |
| 6,058,186 | A | 5/2000 | Enari |
| 6,058,192 | A | 5/2000 | Guralnick et al. |
| 6,061,451 | A | 5/2000 | Muratani et al. |
| 6,064,748 | A | 5/2000 | Hogan |
| 6,065,050 | A | 5/2000 | DeMoney |
| 6,069,647 | A | 5/2000 | Sullivan et al. |
| 6,070,245 | A | 5/2000 | Murphy, Jr. et al. |
| 6,072,872 | A | 6/2000 | Chang et al. |
| 6,072,873 | A | 6/2000 | Bewick |
| 6,073,122 | A | 6/2000 | Wool |
| 6,088,450 | A | 7/2000 | Davis et al. |
| 6,105,134 | A | 8/2000 | Pinder et al. |
| 6,108,422 | A | 8/2000 | Newby et al. |
| 6,115,821 | A | 9/2000 | Newby et al. |
| 6,118,873 | A | 9/2000 | Lotspiech et al. |
| 6,134,237 | A | 10/2000 | Brailean et al. |
| 6,134,551 | A | 10/2000 | Aucsmith |
| 6,138,237 | A | 10/2000 | Ruben et al. |
| 6,148,082 | A | 11/2000 | Slattery et al. |
| 6,154,206 | A | 11/2000 | Ludtke |
| 6,157,719 | A | 12/2000 | Wasilewski et al. |
| 6,181,334 | B1 | 1/2001 | Freeman et al. |
| 6,185,369 | B1 | 2/2001 | Ko et al. |
| 6,185,546 | B1 | 2/2001 | Davis |
| 6,189,096 | B1 | 2/2001 | Haverty |
| 6,192,131 | B1 | 2/2001 | Geer et al. |
| 6,199,053 | B1 | 3/2001 | Herbert et al. |
| 6,204,843 | B1 | 3/2001 | Freeman et al. |
| 6,209,098 | B1 | 3/2001 | Davis |
| 6,215,484 | B1 | 4/2001 | Freeman et al. |
| 6,222,924 | B1 | 4/2001 | Salomaki |
| 6,223,290 | B1 | 4/2001 | Larsen et al. |
| 6,226,618 | B1 | 5/2001 | Downs |
| 6,229,895 | B1 | 5/2001 | Son et al. |
| 6,230,194 | B1 | 5/2001 | Frailong et al. |
| 6,230,266 | B1 | 5/2001 | Perlman et al. |
| 6,236,727 | B1 | 5/2001 | Ciacelli et al. |
| 6,240,553 | B1 | 5/2001 | Son et al. |
| 6,246,720 | B1 | 6/2001 | Kutner et al. |
| 6,256,747 | B1 | 7/2001 | Inohara et al. |
| 6,263,506 | B1 | 7/2001 | Ezaki et al. |
| 6,266,416 | B1 | 7/2001 | Sigbjornsen et al. |
| 6,266,480 | B1 | 7/2001 | Ezaki et al. |
| 6,272,538 | B1 | 8/2001 | Holden et al. |
| 6,278,783 | B1 | 8/2001 | Kocher et al. |
| 6,289,455 | B1 | 9/2001 | Kocher et al. |
| 6,292,568 | B1 | 9/2001 | Atkins, III et al. |
| 6,292,892 | B1 | 9/2001 | Davis |
| 6,307,939 | B1 | 10/2001 | Vigarie |
| 6,311,012 | B1 | 10/2001 | Cho et al. |
| 6,324,288 | B1 | 11/2001 | Hoffman |
| 6,351,538 | B1 | 2/2002 | Uz |
| 6,351,813 | B1 | 2/2002 | Mooney et al. |
| 6,377,589 | B1 | 4/2002 | Knight et al. |
| 6,378,130 | B1 | 4/2002 | Adams |
| 6,389,533 | B1 | 4/2002 | Davis et al. |
| 6,389,537 | B1 | 4/2002 | Davis et al. |
| 6,415,031 | B1* | 7/2002 | Colligan et al. ............ 380/200 |
| 6,415,101 | B1 | 7/2002 | deCarmo et al. |
| 6,418,169 | B1 | 7/2002 | Datari |
| 6,424,717 | B1 | 7/2002 | Pinder et al. |
| 6,430,361 | B2 | 8/2002 | Lee |
| 6,445,738 | B1 | 9/2002 | Zdepski et al. |
| 6,449,718 | B1 | 9/2002 | Rucklidge et al. |
| 6,452,923 | B1 | 9/2002 | Gerszberg et al. |
| 6,453,115 | B1 | 9/2002 | Boyle |
| 6,456,985 | B1 | 9/2002 | Ohtsuka |
| 6,459,427 | B1 | 10/2002 | Mao et al. |
| 6,463,152 | B1 | 10/2002 | Takahashi |
| 6,466,671 | B1 | 10/2002 | Maillard et al. |
| 6,505,032 | B1 | 1/2003 | McCorkle et al. |
| 6,505,299 | B1 | 1/2003 | Zeng et al. |
| 6,510,554 | B1 | 1/2003 | Gorden et al. |
| 6,519,693 | B1 | 2/2003 | Debey |
| 6,526,144 | B2 | 2/2003 | Markandey et al. |
| 6,529,526 | B1 | 3/2003 | Schneidewend |
| 6,543,053 | B1 | 4/2003 | Li et al. |
| 6,549,229 | B1 | 4/2003 | Kirby et al. |
| 6,550,008 | B1 | 4/2003 | Zhang et al. |
| 6,557,031 | B1 | 4/2003 | Mimura et al. |
| 6,587,561 | B1 | 7/2003 | Sered et al. |
| 6,590,979 | B1 | 7/2003 | Ryan |
| 6,640,145 | B2 | 10/2003 | Hoffberg et al. |
| 6,640,305 | B2 | 10/2003 | Kocher et al. |
| 6,650,754 | B2 | 11/2003 | Akiyama et al. |
| 6,654,389 | B1 | 11/2003 | Brunheroto et al. |
| 6,678,740 | B1 | 1/2004 | Rakib et al. |
| 6,681,326 | B2 | 1/2004 | Son et al. |
| 6,684,250 | B2 | 1/2004 | Anderson et al. |
| 6,697,489 | B1 | 2/2004 | Candelore |
| 6,697,944 | B1 | 2/2004 | Jones et al. |
| 6,707,696 | B1 | 3/2004 | Turner et al. |
| 6,714,650 | B1 | 3/2004 | Maillard et al. |
| 6,754,276 | B1 | 6/2004 | Harumoto et al. |
| 6,772,340 | B1 | 8/2004 | Peinado et al. |
| 6,788,690 | B2 | 9/2004 | Harri |
| 6,788,882 | B1 | 9/2004 | Geer et al. |
| 6,826,185 | B1 | 11/2004 | Montanaro et al. |
| 6,883,050 | B1 | 4/2005 | Safadi |
| 6,891,565 | B1 | 5/2005 | Dietrich |
| 6,895,128 | B2 | 5/2005 | Bohnenkamp |
| 6,904,520 | B1 | 6/2005 | Rosset et al. |
| 6,917,684 | B1 | 7/2005 | Tatebayashi et al. |
| 6,938,162 | B1 | 8/2005 | Nagai et al. |
| 6,976,166 | B2 | 12/2005 | Herley et al. |
| 7,039,802 | B1 | 5/2006 | Eskicioglu et al. |
| 7,039,938 | B2 | 5/2006 | Candelore |
| 7,065,213 | B2 | 6/2006 | Pinder |
| 7,096,481 | B1 | 8/2006 | Forecast et al. |
| 7,120,250 | B2 | 10/2006 | Candelore |
| 7,124,303 | B2 | 10/2006 | Candelore |
| 7,127,619 | B2 | 10/2006 | Unger et al. |
| 7,139,398 | B2 | 11/2006 | Candelore et al. |
| 7,146,007 | B1 | 12/2006 | Maruo et al. |
| 7,151,831 | B2 | 12/2006 | Candelore et al. |
| 7,151,833 | B2 | 12/2006 | Candelore et al. |
| 7,155,012 | B2 | 12/2006 | Candelore et al. |
| 2001/0030959 | A1 | 10/2001 | Ozawa et al. |
| 2001/0036271 | A1 | 11/2001 | Javed |
| 2001/0051007 | A1 | 12/2001 | Teshima |
| 2002/0003881 | A1 | 1/2002 | Reitmeier et al. |
| 2002/0021805 | A1 | 2/2002 | Schumann et al. |
| 2002/0026587 | A1 | 2/2002 | Talstra et al. |
| 2002/0046406 | A1 | 4/2002 | Chelehmal et al. |
| 2002/0047915 | A1 | 4/2002 | Misu |
| 2002/0059425 | A1 | 5/2002 | Belfiore et al. |
| 2002/0066101 | A1 | 5/2002 | Gordon et al. |
| 2002/0083317 | A1 | 6/2002 | Ohta et al. |
| 2002/0083438 | A1 | 6/2002 | So et al. |
| 2002/0097322 | A1 | 7/2002 | Monroe et al. |
| 2002/0108035 | A1 | 8/2002 | Herley et al. |
| 2002/0116705 | A1 | 8/2002 | Perlman et al. |
| 2002/0126890 | A1 | 9/2002 | Katayama et al. |
| 2002/0129243 | A1 | 9/2002 | Nanjundiah |
| 2002/0144260 | A1 | 10/2002 | Devara |
| 2002/0150239 | A1* | 10/2002 | Carny et al. .................. 380/37 |

| | | | | | | |
|---|---|---|---|---|---|---|
| 2002/0157115 A1 | 10/2002 | Lu | | 2004/0151314 A1 | 8/2004 | Candelore |
| 2002/0164022 A1 | 11/2002 | Strasser et al. | | 2004/0158721 A1 | 8/2004 | Candelore |
| 2002/0170053 A1 | 11/2002 | Peterka et al. | | 2004/0165586 A1 | 8/2004 | Read et al. |
| 2002/0184506 A1 | 12/2002 | Perlman | | 2004/0172650 A1 | 9/2004 | Hawkins et al. |
| 2002/0194613 A1 | 12/2002 | Unger | | 2004/0181666 A1 | 9/2004 | Candelore |
| 2002/0196939 A1 | 12/2002 | Unger et al. | | 2004/0187161 A1 | 9/2004 | Cao |
| 2003/0002854 A1 | 1/2003 | Belknap et al. | | 2004/0193550 A1 | 9/2004 | Siegal |
| 2003/0009669 A1 | 1/2003 | White et al. | | 2004/0240668 A1 | 12/2004 | Bonan et al. |
| 2003/0012286 A1 | 1/2003 | Ishtiaq et al. | | 2004/0247122 A1 | 12/2004 | Hobrock et al. |
| 2003/0021412 A1 | 1/2003 | Candelore et al. | | 2004/0261099 A1 | 12/2004 | Durden et al. |
| 2003/0026423 A1 | 2/2003 | Unger et al. | | 2004/0267602 A1 | 12/2004 | Gaydos et al. |
| 2003/0026523 A1 | 2/2003 | Unger et al. | | 2005/0004875 A1 | 1/2005 | Kontio et al. |
| 2003/0028879 A1 | 2/2003 | Gordon et al. | | 2005/0028193 A1 | 2/2005 | Candelore et al. |
| 2003/0035482 A1 | 2/2003 | Klompenhouwer et al. | | 2005/0036067 A1 | 2/2005 | Ryal et al. |
| 2003/0035540 A1 | 2/2003 | Freeman et al. | | 2005/0063541 A1 | 3/2005 | Candelore |
| 2003/0035543 A1 | 2/2003 | Gillon | | 2005/0066357 A1 | 3/2005 | Ryal |
| 2003/0046686 A1 | 3/2003 | Candelore et al. | | 2005/0071669 A1 | 3/2005 | Medvinsky et al. |
| 2003/0046687 A1 | 3/2003 | Hodges et al. | | 2005/0094808 A1 | 5/2005 | Pedlow, Jr. et al. |
| 2003/0059047 A1 | 3/2003 | Iwamura | | 2005/0094809 A1 | 5/2005 | Pedlow, Jr. et al. |
| 2003/0063615 A1 | 4/2003 | Luoma et al. | | 2005/0097596 A1 | 5/2005 | Pedlow, Jr. |
| 2003/0072555 A1 | 4/2003 | Yap et al. | | 2005/0097597 A1 | 5/2005 | Pedlow, Jr. et al. |
| 2003/0077071 A1 | 4/2003 | Lin et al. | | 2005/0097598 A1 | 5/2005 | Pedlow, Jr. et al. |
| 2003/0081630 A1 | 5/2003 | Mowery et al. | | 2005/0097614 A1 | 5/2005 | Pedlow, Jr. et al. |
| 2003/0081776 A1 | 5/2003 | Candelore | | 2005/0102702 A1 | 5/2005 | Candelore et al. |
| 2003/0084284 A1 | 5/2003 | Ando et al. | | 2005/0129233 A1 | 6/2005 | Pedlow, Jr. |
| 2003/0097662 A1 | 5/2003 | Russ et al. | | 2005/0141713 A1 | 6/2005 | Genevois |
| 2003/0112333 A1 | 6/2003 | Chen et al. | | 2005/0169473 A1 | 8/2005 | Candelore |
| 2003/0118243 A1 | 6/2003 | Sezer et al. | | 2005/0192904 A1 | 9/2005 | Candelore |
| 2003/0123664 A1 | 7/2003 | Pedlow et al. | | 2005/0198586 A1 | 9/2005 | Sekiguchi et al. |
| 2003/0123849 A1 | 7/2003 | Nallur et al. | | 2005/0259813 A1 | 11/2005 | Wasilewski et al. |
| 2003/0126088 A1 | 7/2003 | Safadi | | 2005/0265547 A1 | 12/2005 | Strasser et al. |
| 2003/0133570 A1 | 7/2003 | Candelore et al. | | 2006/0115083 A1 | 6/2006 | Candelore et al. |
| 2003/0140257 A1* | 7/2003 | Peterka et al. ............ 713/201 | | 2006/0130119 A1 | 6/2006 | Candelore et al. |
| 2003/0145329 A1* | 7/2003 | Candelore .................... 725/87 | | 2006/0130121 A1 | 6/2006 | Candelore et al. |
| 2003/0152224 A1 | 8/2003 | Candelore et al. | | 2006/0136976 A1 | 6/2006 | Coupe et al. |
| 2003/0152226 A1 | 8/2003 | Candelore et al. | | 2006/0153379 A1 | 7/2006 | Candelore et al. |
| 2003/0156718 A1 | 8/2003 | Candelore et al. | | 2006/0168616 A1 | 7/2006 | Candelore |
| 2003/0159139 A1 | 8/2003 | Candelore et al. | | 2006/0174264 A1 | 8/2006 | Candelore |
| 2003/0159140 A1 | 8/2003 | Candelore | | 2006/0262926 A1 | 11/2006 | Candelore et al. |
| 2003/0159152 A1 | 8/2003 | Lin et al. | | 2006/0269060 A1 | 11/2006 | Candelore et al. |
| 2003/0174837 A1 | 9/2003 | Candelore et al. | | | | |
| 2003/0174844 A1 | 9/2003 | Candelore | | | | |

FOREIGN PATENT DOCUMENTS

| | | |
|---|---|---|
| EP | 0527611 | 7/1992 |
| EP | 0558016 | 2/1993 |
| EP | 0596826 | 4/1993 |
| EP | 0610587 | 12/1993 |
| EP | 0680209 | 4/1995 |
| EP | 0674440 | 9/1995 |
| EP | 0674441 | 9/1995 |
| EP | 0833517 | 4/1998 |
| EP | 0866615 | 9/1998 |
| EP | 1187483 | 3/2002 |
| JP | 7067028 | 3/1995 |
| JP | 11243534 | 10/2002 |
| WO | WO 86/07224 | 12/1986 |
| WO | WO 94/10775 | 5/1994 |
| WO | WO 97/38530 | 10/1997 |
| WO | WO 00/31964 | 6/2000 |
| WO | WO 01/65762 | 9/2001 |
| WO | WO 01/78386 | 10/2001 |

| | | | |
|---|---|---|---|
| 2003/0188154 A1* | 10/2003 | Dallard et al. ............ 713/153 | |
| 2003/0188164 A1 | 10/2003 | Okimoto et al. | |
| 2003/0190054 A1 | 10/2003 | Troyansky et al. | |
| 2003/0193973 A1 | 10/2003 | Takashimizu et al. | |
| 2003/0198223 A1 | 10/2003 | Mack et al. | |
| 2003/0204717 A1 | 10/2003 | Kuehnel | |
| 2003/0222994 A1 | 12/2003 | Dawson | |
| 2003/0226149 A1 | 12/2003 | Chun et al. | |
| 2003/0228018 A1* | 12/2003 | Vince .......................... 380/277 | |
| 2004/0003008 A1 | 1/2004 | Wasilewski et al. | |
| 2004/0010717 A1* | 1/2004 | Simec et al. ................ 713/201 | |
| 2004/0021764 A1 | 2/2004 | Driscoll, Jr. et al. | |
| 2004/0028227 A1* | 2/2004 | Yu .............................. 380/201 | |
| 2004/0047470 A1 | 3/2004 | Candelore | |
| 2004/0049688 A1 | 3/2004 | Candelore et al. | |
| 2004/0049690 A1 | 3/2004 | Candelore et al. | |
| 2004/0049691 A1 | 3/2004 | Candelore et al. | |
| 2004/0049694 A1 | 3/2004 | Candelore | |
| 2004/0064688 A1 | 4/2004 | Jacobs | |
| 2004/0068659 A1 | 4/2004 | Diehl | |
| 2004/0073917 A1 | 4/2004 | Pedlow, Jr. et al. | |
| 2004/0078575 A1 | 4/2004 | Morten et al. | |
| 2004/0081333 A1* | 4/2004 | Grab et al. ................. 382/100 | |
| 2004/0086127 A1 | 5/2004 | Candelore | |
| 2004/0088552 A1 | 5/2004 | Candelore | |
| 2004/0088558 A1 | 5/2004 | Candelore | |
| 2004/0091109 A1* | 5/2004 | Son et al. .................. 380/200 | |
| 2004/0100510 A1 | 5/2004 | Milic-Frayling et al. | |
| 2004/0123094 A1 | 6/2004 | Sprunk | |
| 2004/0136532 A1 | 7/2004 | Pinder et al. | |
| 2004/0139337 A1 | 7/2004 | Pinder et al. | |

OTHER PUBLICATIONS

U.S. Appl. No. 10/038,032, filed Jan. 2, 2002, Time Division Partial Encryption.

U.S. Appl. No. 10/037,914, filed Jan. 2, 2002, Elementary Stream Partial Encryption.

U.S. Appl. No. 10/037,499, filed Jan. 2, 2002, Partial Encryption and PID Mapping.

U.S. Appl. No. 10/037,498, filed Jan. 2, 2002, Decoding and Decryption of Partially Encrypted Information.

U.S. Appl. No. 10/273,905, filed Oct. 18, 2002, Video Slice and Active Region Based Dual Partial Encryption.

U.S. Appl. No. 10/319,133, filed Dec. 13, 2002, Selective Encryption for Video on Demand.
U.S. Appl. No. 10/273,875, filed Oct. 18, 2002, Encryption and Content Control in a Digital Broadcast System.
U.S. Appl. No. 10/084,106, filed Feb. 27, 2002, Reconstitution of Program Streams Split Across Multiple Program Identifiers.
U.S. Appl. No. 10/273,903, filed Oct. 18, 2002, Star Pattern Partial Encryption.
U.S. Appl. No. 10/274,084, filed Oct. 18, 2002, Slice Mask and Moat Pattern Partial Encrytpion.
U.S. Appl. No. 10/319,066, filed Dec. 13, 2002, Content Replacement by PID Mapping.
U.S. Appl. No. 10/293,761, filed Nov. 13, 2002, Upgrading of Encryption.
U.S. Appl. No. 10/318,782, filed Dec. 13, 2002, Content Distribution for Multiple Digital Rights Management.
U.S. Appl. No. 10/319,169, filed Dec. 13, 2002, Selective Encryption to Enable Multiple Decryption Keys.
U.S. Appl. No. 10/273,904, filed Oct. 18, 2002, Multiple Partial Encryption Using Retuning.
U.S. Appl. No. 10/319,096, filed Dec. 13, 2002, Selective Encryption to Enable Trick Play, Abandoned.
U.S. Appl. No. 10/391,940, filed Mar. 19, 2003, Selective Encryption to Enable Trick Play.
U.S. Appl. No. 10/303,594, filed Nov. 25, 2002, Progressive Video Refresh Slice Detection.
U.S. Appl. No. 10/274,019, filed Oct. 18, 2002, Video Scene Change Detection.
U.S. Appl. No. 10/393,324, filed Mar. 20, 2003, Auxiliary Program Association Table.
U.S. Appl. No. 10/373,479, filed Feb. 24, 2003, PID Filter Based Network Routing.
U.S. Appl. No. 10/767,421, filed Jan. 29, 2004, Content Scrambling With Minimal Impact on Legacy Devices.
U.S. Appl. No. 10/662,585, filed Sep. 15, 2003, Decryption System.
U.S. Appl. No. 10/667,614, filed Sep. 22, 2003, Modifying Content Rating.
U.S. Appl. No. 10/634,546, filed Aug. 5, 2003, Variable Perspective View of Video Images.
U.S. Appl. No. 10/822,891, filed Apr. 13, 2004, Macro-Block Based Content Replacement by PID Mapping.
U.S. Appl. No. 10/764,202, filed Jan. 23, 2004, Re-Encrypted Delivery of Video On Demand Content.
U.S. Appl. No. 10/828,737, filed Apr. 21, 2004, Batch Mode Session-based Encryption of Video on Demand Content.
U.S. Appl. No. 10/764,011, filed Jan. 23, 2004, Bi-Directional Indices for Trick Mode Video-on-Demand.
U.S. Appl. No. 10/802,084, filed Mar. 16, 2004, Hybrid Storage of Video on Demand Content.
U.S. Appl. No. 10/802,007, filed Mar. 16, 2004, Dynamic Composition of Pre-Encrypted Video on Demand Content.
U.S. Appl. No. 10/774,871, filed Feb. 9, 2004, Cablecard with Content Manipulation.
U.S. Appl. No. 10/802,008, filed Mar. 16, 2004, Preparation of Content for Multiple Conditional Access Methods in Video on Demand.
U.S. Appl. No. 10/823,431, filed Apr. 13, 2004, Composite Session-Based Encryption of Video on Demand.
U.S. Appl. No. 10/964,267, filed Oct. 13, 2004, Multiple Selective Encryption with DRM.
U.S. Appl. No. 10/763,865, filed Jan. 22, 2004, Method And Apparatus For Securing Control Words.
U.S. Appl. No. 10/387,163, filed Mar. 22, 2003, Method and Apparatus for Protecting the Transfer of Data.
U.S. Appl. No. 10/815,371, filed Mar. 31, 2004, IP Delivery of Secure Digital Content.
U.S. Appl. No. 10/764,682, filed Jan. 23, 2004, System, Method and Apparatus for Secure Digital Content Transmission.
U.S. Appl. No. 10/388,002, filed Mar. 12, 2003, Mechanism for Protecting the Transfer of Digital Content.
U.S. Appl. No. 10/690,192, filed Mar. 12, 2003, Descrambler.
U.S. Appl. No. 10/691,170, filed Oct. 5, 2003, Multi-Process.

U.S. Appl. No. 10/403,834, filed Mar. 31, 2003, System and Method for Partially Encrypted Multimedia System.
"A Report on Security Issues in Multimedia" by Gulwani, pp. 10-14, Apr. 30, 2000, Course Notes, Department of Computer Science and Engineering, Indian Institute of Technology Kanpur.
"Ad Agencies and Advertisers To Be Empowered with Targeted Ads Delivered by Television's Prevailing Video Servers" Article Business Section of The New York Times, Updated Thursday, Dec. 20, 2001.
"An Efficient MPEG Video Encryption Algorithm" Shi and Bhargava, pp. 381-386, 1998 IEEE.
"An Empirical Study of Secure MPEG Video Transmissions" by Agi and Gong, pp. 137-144, 1996, IEEE, Proceedings of SNDSS '96.
"Applying Encryption to Video Communication" by Kunkelmann, pp. 41-47, Sep. 1998, Multimedia and Security Workshop at ACM Multimedia '98. Bristol, U.K.
"Comparison of MPEG Encryption Algorithms" by Qiao and Nahrstedt, Jan. 17, 1998, Preprint submitted to Elsevier Science.
"Coral Consortium Aims to Make DRM Interoperable", by Bill Rosenblatt, Oct. 7, 2004, online at http://www.drmwatch.com/standards/article.php/3418741.
"DVD Demystified—The Guidebook for DVD-Video and DVD-ROM" by Jim Taylor, Pub. McGraw-Hill, 1998, ISBN: 0-07-064841-7, pp. 134-147.
"Dynamic-Customized TV Advertising Creation and Production Tools" by SeaChange International, Web Site Literature.
"Efficient Frequency Domain Video Scrambling for Content Access Control" by Zeng and Lei, Nov. 1999, In Proc. ACM Multimedia.
"Evaluation of Selective Encryption Techniques for Secure Transmission of MPEG-Compressed Bit-Streams" by Alattar and Al-Regib, pp. IV-340 to IV-343, 1999, IEEE.
"Fast Encryption Methods for Audiovisual Data Confidentiality" by Wu and Kuo, Nov. 2000, SPIE International Symposia on Information Technologies 2000, (Boston, Ma., USA).
"Improved Selective Encryption Techniques for Secure Transmission of MPEG Video Bit-Streams" by Alattar, Al-Regib and Al-Semari, pp. 256-260, 1999, IEEE.
Metro Media™ PVR-DVD-MP3-Web—Internet publication from www.metrolink.com, undated.
"Multimedia and Security Workshop at ACM Multimedia '98. Bristol, U.K., Sep. 1998.
"Passage™, Freedom to Choose", 2003, Sony Electronics Inc.
"Performance Study of Selective Encryption Scheme for the Security of Networked, Real-Time Video" by Spanos and Maples, pp, 2-10, 1995, IEEE.
"Pre-Encryption Profiles—Concept Overview and Proposal", Rev. 1.2 as submitted to the Open CAS consortium on Dec. 28, 2000.
"Run-Time Performance Evaluation for a Secure MPEG System Supporting Both Selective Watermarking and Encryption" by Wu and Wu, Mar. 1, 1997, submitted to JSAC special issue on Copyright and Privacy Protection.
"Selective Encryption and Watermarking of MPEG Video (Extended Abstract)" by Wu and Wu, Feb. 17, 1997, submitted to International Conference on Image Science, Systems, and Technology, CISST'97.
"The Long March to Interoperable Digital Rights Management" by Koenen et al., pp. 1-17, 2004, IEEE.
"Transport Streams Insertion of Video in the Compressed Digital Domain" by SeaChange International, Web Site Literature, 2000.
"Visible World—A High Impact Approach to Customized Television Advertising" by Haberman, Dec. 2001.
Anonymous, Message Authentication with Partial Encryption, Research discosure RD 296086, Dec. 10, 1998.
Anonymous, New Digital Copy Protection Proposal Would Secure Authorized Copies, PR Newswire, Nov. 1998, pp. 1-3.
Aravind, H., et al., "Image and Video Coding Standards", AT&T Technical Journal, (Jan./Feb. 1993),67-68.
Gonzalez, R. C., et al., "Digital Image Processing", Addison Wesley Publishing Company, Inc., (1992),346-348.
Kim, et al., "Bit Rate Reduction Algorithm for a Digital VCR", IEEE Transactions on Consumer Electronics, vol. 37, No. 3, (Aug. 1, 1992), 267-274.

Kondo, et al., "A New Concealment Method for Digital VCRs", IEEE Visual Signal Processing and Communication, Melbourne, Australia,(Sep. 1993),20-22.

Kondo, et al., "Adaptive Dynamic Range Coding Scheme for Future Consumer Digital VTR", 219-226.

Kondo, et al., "Adaptive Dynamic Range Coding Scheme for Future HDTV Digital VTR", Sony Corporation, (1991).

Lakshiminath, et al., "A Dual Protocol for Scalable Secure Multicasting", 1999 International Symposium on Computers and Communication, Jul. 6-8, 1999.

Lookabaugh et al., "Selective Encryption and MPEG-2", ACM Multimedia '03, Nov. 2003.

Menezes, Alfred J., et al., "Handbook of Applied Cryptography", CRC Press, 551-553.

NHK Laboratories Note, "Error Correction, Concealment and Shuffling", No. 424, (Mar. 1994),29-44.

Park, et al., "A Simple Concealment for ATM Bursty Cell Loss", IEEE Transactions on Consumer Electronics, No. 3, (Aug. 1993),704-709.

Robert et al., "Digital Cable: The Key to Your Content", Access Intelligence's Cable Group, Feb. 2002, online at http:www.cableworld.com/ct/archives/0202/0202digitalrights.htm.

Tom, et al., "Packet Video for Cell Loss Protection Using Deinterleaving and Scrambling", ICASSP 91: 1991 International Conference on Acoustics, Speech and Signal Processing, vol. 4, (Apr. 1991),2857-2860.

Zhu, et al., "Coding and Cell-Loss Recovery in DCT-Based Packet Video", IEEE Transactions on Circuits and Systems for Video Technology, No. 3, NY,(Jun. 3, 1993).

"ClearPlay: The Technology of Choice", from web site, ClearPlay 2001-2003.

Alattar, A.M. et al., Improved selective encryption techniques for secure transmission of MPEG video bitstreams, Oct. 24, 1999, Digimarc Corp., Lake Oswego, OR, USA, IEEE, pp. 256-260.

Kunkelmann T. et al., A scalable security architecture for multimedia communication standards, Darmstard Univ. of Technology, ITO, Germany, 1997, pp. 660-661.

YIP, Kun-Wah, Partial-encryption technique for intellectual property protection of FPGA-Based products, Dec. 15, 1999, IEEE, pp. 183-190.

International Search Report for application No. PCT/US2004/032228.

Liu, et al. Motion Vector Encryption in Multimedia Streaming, 2004, IEEE, pp. 64-71.

International Search Report and Written Opinion, PCT/US04/32231, Mar. 14, 2006.

Microsoft Windows XP, Oct. 2001, Microsoft, Screen Shots and Help Files.

MPEG-2 Digital Broadcast Pocket Guide vol. 6, 2001 Copyright 201 Acterna, LLC.

"How Networks Works—Milennium Edition" —pp. 88-89, Que Corporation, 2000.

* cited by examiner

DYNAMIC COMPOSITION OF PRE-ENCRYPTED VIDEO ON DEMAND CONTENT

CROSS REFERENCE TO RELATED DOCUMENTS

This application is related to and claims priority benefit of U.S. Provisional Patent Application Ser. No. 60/516,050 filed Oct. 31, 2003 to Pedlow et al. for "Dynamic Composition of Pre-Encrypted Video On Demand Content" which is hereby incorporated by reference. This application is also related to U.S. patent application entitled "Critical Packet Partial Encryption" to Unger et al., Ser. No. 10/038,217; patent applications entitled "Time Division Partial Encryption" to Candelore et al., Ser. No. 10/038,032; entitled "Elementary Stream Partial Encryption" to Candelore, Ser. No. 10/037,914; entitled "Partial Encryption and PID Mapping" to Unger et al., Ser. No. 10/037,499; and entitled "Decoding and Decrypting of Partially Encrypted Information" to Unger et al., Ser. No. 10/037,498 all of which were filed on Jan. 2, 2002 and are hereby incorporated by reference herein.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

The Passage™ initiative (Passage is a trademark of Sony Electronics Inc.), promoted by Sony, provides a mechanism for MSOs (Multiple Service Operators) to deploy non-legacy headend equipment, subscriber devices and services on their existing legacy networks. At present, in the USA, these networks are most commonly supplied by either Motorola (formerly General Instrument) or Scientific Atlanta. These two companies at present constitute better than a 99% share of the US cable system market as turnkey system providers. The systems, by design, employ proprietary technology and interfaces precluding the introduction of non-incumbent equipment into the network. An MSO, once choosing one of these suppliers during conversion from an analog cable system to a digital cable system, faces a virtual monopoly when seeking suppliers for additional equipment as their subscriber base or service offering grows.

Before the Passage™ initiative, the only exit from this situation was to forfeit the considerable capital investment already made with the incumbent provider, due to the intentional incompatibility of equipment between the incumbent and other sources. One primary barrier to interoperability is in the area of conditional access (CA) systems, the heart of addressable subscriber management and revenue collection resources in a modern digital cable network.

The Passage™ technologies were developed to allow the independent coexistence of two or more conditional access systems on a single, common plant. Unlike other attempts to address the issue, the two systems operate with a common transport stream without any direct or indirect interaction between the conditional access systems. Some of the basic processes used in these technologies are discussed in detail in the above-referenced pending patent applications.

The above-referenced commonly owned patent applications, and others, describe inventions relating to various aspects of methods generally referred to herein as partial encryption or selective encryption, consistent with certain aspects of Passage™. More particularly, systems are described therein wherein selected portions of a particular selection of digital content are encrypted using two (or more) encryption techniques while other portions of the content are left unencrypted. By properly selecting the portions to be encrypted, the content can effectively be encrypted for use under multiple decryption systems without the necessity of encryption of the entire selection of content. In some embodiments, only a few percent of data overhead is consumed to effectively encrypt the content using multiple encryption systems. This results in a cable or satellite system being able to utilize Set-top boxes (STB) or other implementations of conditional access (CA) receivers (subscriber terminals) from multiple manufacturers in a single system—thus freeing the cable or satellite company to competitively shop for providers of Set-top boxes.

In each of these disclosures, the clear content is identified using a primary Packet Identifier (PID). A secondary PID (or shadow PID) is also assigned to the program content. Selected portions of the content are encrypted under two (or more) encryption systems and the encrypted content transmitted using both the primary and secondary PIDs (one PID or set of PIDs for each encryption system). The so-called legacy STBs operate in a normal manner decrypting encrypted packets arriving under the primary PID and ignoring secondary PIDs. The newer (non-legacy) STBs operate by associating both the primary and secondary PIDs with a single program. Packets with a primary PID are decoded normally and packets with a secondary PID are first decrypted then decoded. The packets associated with both PIDs are then assembled together to make up a single program stream. The PID values associated with the packets are generally remapped to a single PID value for decoding (e.g., shadow PIDs remapped to the primary PID value or vice versa.)

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

ACRONYMS, ABBREVIATIONS AND DEFINITIONS

Figure 1:
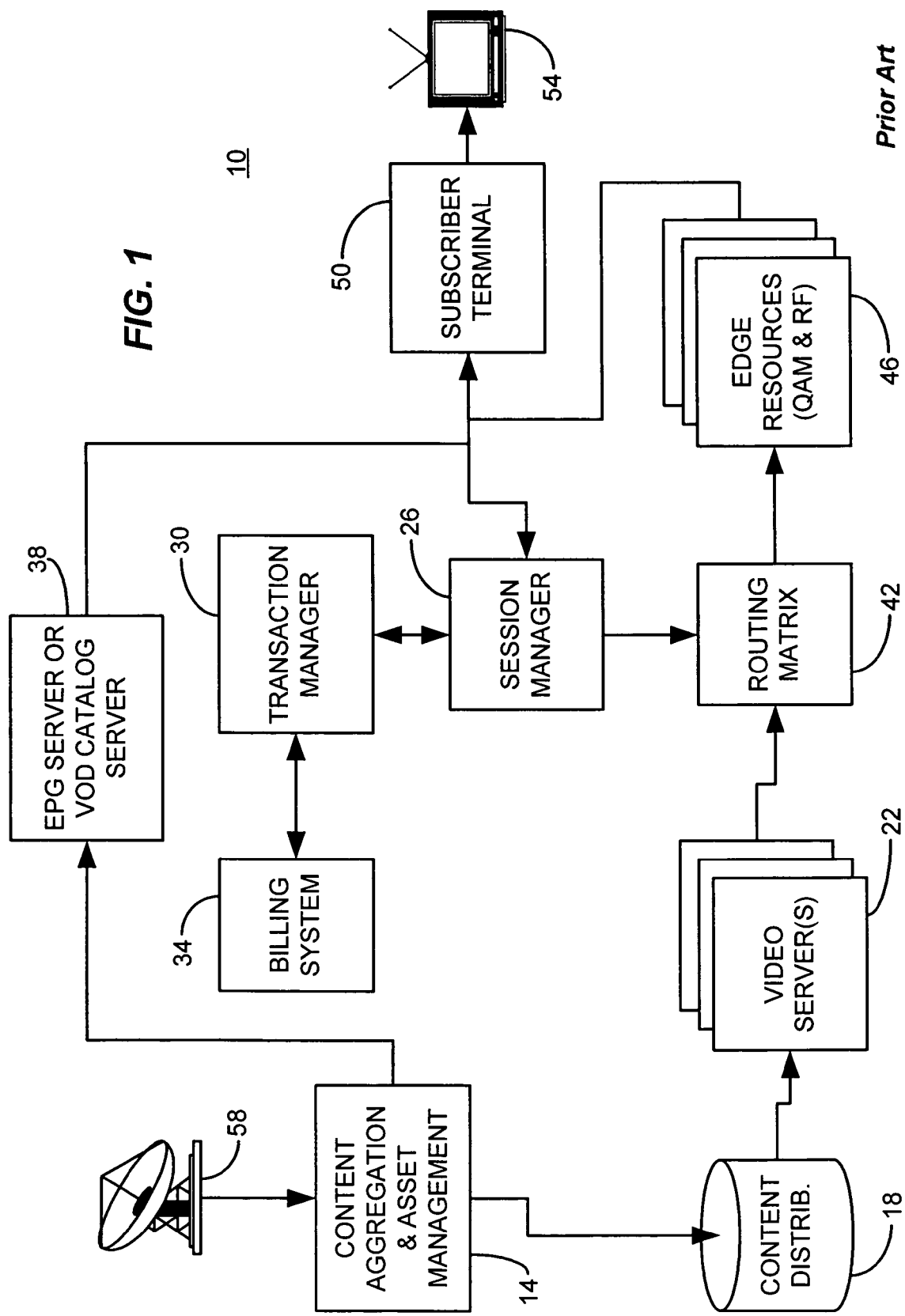
FIG. 1 is a block diagram of a clear video VOD system.

ASI—Asynchronous Serial Interface
CA—Conditional Access
CASID—Conditional Access System Identifier
CPE—Customer Premises Equipment
DHEI—Digital Headend Extended Interface
ECM—Entitlement Control Message
EPG—Electronic Program Guide
GOP—Group of Pictures (MPEG)
MPEG—Moving Pictures Experts Group
MSO—Multiple System Operator
PAT—Program Allocation Table
PID—Packet Identifier
PMT—Program Map Table
PSI—Program Specific Information
QAM—Quadrature Amplitude Modulation
RAID—Redundant Array of Independent Disks
RAM—Random Access Memory
SAN—Storage Area Network
VOD—Video on Demand
Critical Packet—A packet or group of packets that, when encrypted, renders a portion of a video image difficult or impossible to view if not properly decrypted, or which renders a portion of audio difficult or impossible to hear if not properly decrypted. The term "critical" should not be interpreted as an absolute term, in that it may be possible to hack an elementary stream to overcome encryption of a "critical packet", but when subjected to normal decoding, the inability to fully or properly decode such a "critical packet" would inhibit normal viewing or listening of the program content.
Selective Encryption (or Partial Encryption)—encryption of only a portion of an elementary stream in order to render the stream difficult or impossible to use (i.e., view or hear).
Dual Selective Encryption—encryption of portions of a single selection of content under two separate encryption systems.
Passage™—Trademark of Sony Electronics Inc. for various single and multiple selective encryption systems, devices and processes.
Trick mode—an operational mode of playback of digital content to simulate fast forward, rewind, pause, suspend (stop), slow motion, etc. operations as in a video tape system.

The terms "a" or "an", as used herein, are defined as one, or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/ dynamic load library and/or other sequence of instructions designed for execution on a computer system.

The terms "scramble" and "encrypt" and variations thereof may be used synonymously herein. Also, the term "television program" and similar terms can be interpreted in the normal conversational sense, as well as a meaning wherein the term means any segment of A/V content that can be displayed on a television set or similar monitor device. The term "storing" as used herein means both the act of placing data into a storage medium and holding the data in storage in the storage medium. The term "video" is often used herein to embrace not only true visual information, but also in the conversational sense (e.g., "video tape recorder") to embrace not only video signals but associated audio and data. The term "legacy" as used herein refers to existing technology used for existing cable and satellite systems. The exemplary embodiments of VOD disclosed herein can be decoded by a television Set-Top Box (STB), but it is contemplated that such technology will soon be incorporated within television receivers of all types whether housed in a separate enclosure alone or in conjunction with recording and/or playback equipment or Conditional Access (CA) decryption module or within a television set itself.

DETAILED DESCRIPTION

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

Clear VOD Architectures

The decision on a particular VOD architecture is the result of the interaction between a complex set of both independent and dependent variables, providing a solution to an equation of state. Some of the variables are fixed directly as a result of choices by the MSO. Others are constrained by factors such as the existing incumbent system, location, size, available capital and ROI requirements.

A generalized VOD system 10, as shown in FIG. 1, contains some or all of the following elements/resources: Content Aggregation and Asset management 14, Content distribution (SAN) 18, Video server module(s) 22, Session Management 26, Transaction management 30, Billing system 34, EPG server or VOD catalog server 38, Transport router/switch fabric (routing matrix) 42, Stream encryption device(s) (not shown in this Figure), and QAM modulators/ upconverters and other edge resources 46. This VOD system 10 provides programming to the subscriber terminals such as 50 for ultimate viewing and listening on a TV set or other monitor device 54.

In operation, content is received from various sources including, but not limited to, satellite broadcasts received via one or more satellite dishes 58. Content is aggregated at 14 and cataloged at EPG server or VOD catalog server 38. Content is then distributed at 18 to one or more video servers 22. When a subscriber orders a VOD selection, a message is sent from the subscriber terminal (e.g., STB) 50 to the session manager 26. The session manager 26 notifies the transaction manager 30 to assure that the billing system 34 is properly brought into play. The session manager 26 selects a VOD server from a cluster of VOD servers having the requested content on it and having a signal path that reaches the node serving the subscriber. The session manager also enables the routing matrix 42 to properly route the selected video content through the correct edge resources 46 for delivery to the subscriber terminal 50.

Trick Modes

Figure 2:
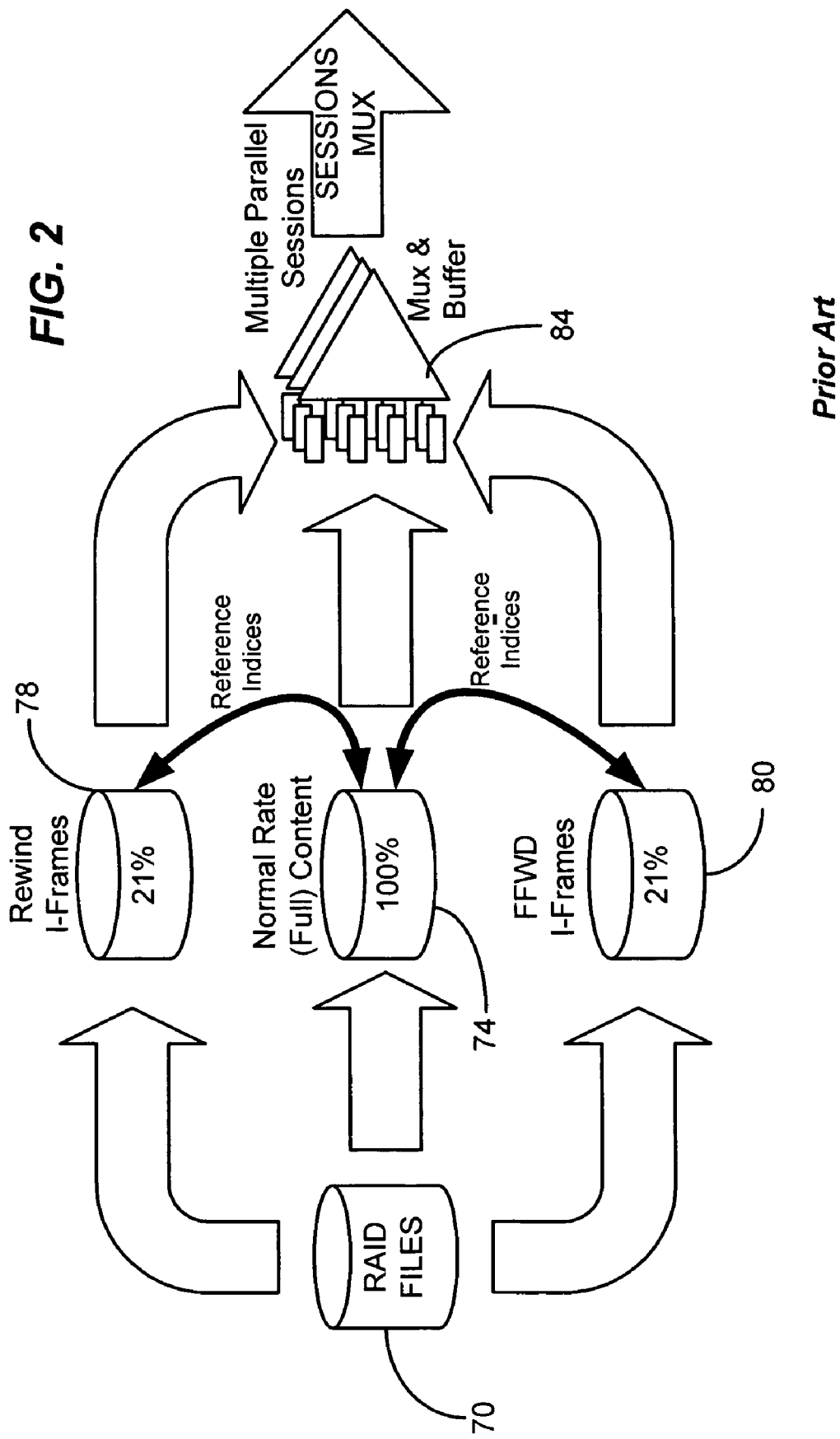
FIG. 2 is a diagram illustrating storage of I-frame data to support trick mode operation in a VOD system.

One aspect of VOD that has become a "signature" feature is the support of "trick modes". These are operational modes invoked by the session client that mimic a traditional VCR or DVD player and includes fast forward, rewind, pause, suspend (stop), slow motion, etc. Trick modes have been heretofore implemented through the creation of multiple files containing a subset of the original content (subfiles) as illustrated in FIG. 2. The content is generally stored in a set of RAID drives 70. A particular selection of content is stored in its entirety in a file 74 within the RAID drives 70. A set of subfiles for rewind and fast forward trick modes (files 78 and 80 respectively) contain I-frames ordered in a manner that will permit playback sequentially to achieve the rewind and fast forward effect. Typically, these subfiles contain only I-frames, since I-frames contain stand-alone whole pictures (see ISO/IEC 13818-2, section 6.1.1.7). I-frames are somewhat larger than B or P frames, and they typically represent approximately as much as 21% of the data in a given video selection.

A file containing only I-frames extracted from the original content affords the ability to have accelerated playback, since typical GOP (group of pictures) structures have only one frame in about 10 to 20 as an I-frame. If the I-frame files are played at normal rates (1 frame per 33 mS) the pictures will appear to the viewer to sequence at about a 10× to 20× rate, though the actual data rate is the same as the original content. If the I-frame sequence is reversed in the file, the motion will appear to run backwards. This is the method used to implement fast forward and rewind trick modes.

By attaching an index count to match the I-frames in the original content file to the duplicated I-frames stored in the associated subfiles 78 and 80, a method is provided to allow immediate transition from normal speed forward play to fast forward or rewind. In operation the video server plays the selected content file and upon subscriber selection of a trick mode (or vice versa) the server notes the index value of the closest I-frame and then opens the appropriate associated subfile 78 or 80 and moves to the I-frame in the subfile with the same corresponding index. The video server treats all stream content (main file or subfiles) the same and always spools the MPEG packets to the outgoing transport stream at the same constant bit rate through multiplexers and buffers 84 as shown. It is through this method that trick modes are typically implemented on a slotted, session based system without the encumbrance of additional, dynamic bit rate issues.

Unfortunately, the use of such multiple subfiles results in storage space inefficiencies. As will be seen, these inefficiencies can become compounded in systems utilizing multiple encryption.

VOD Program Specific Information

A function of the VOD video server(s) 22, in addition to origination of session A/V content, is the creation of the associated, session specific PSI (program specific information). This information is a departure from the broadcast model in that the PSI is extremely dynamic. The content of the PAT and subordinate PMTs change whenever a new session is started or ended. In the broadcast world, the PSI changes very seldom because the PSI tables reflect only the structure of the transport multiplex, not the actual A/V content carried within.

The VOD video server 22 dynamically assigns a new session to an existing, available "slot" in an outgoing transport multiplexed stream. The slot is denoted by the MPEG program number and in many cases, the combination of which transport stream (TSID) and program number determine at the service level a unique session and the routing that occurs as a result. Edge resources 46 generally are not configured dynamically. The routing of content appearing on a particular input port to a specific QAM carrier at the output is determined through a preconfigured, static assignment of TSID/input port and program number mapping to specific QAM resources in the device. This same mapping information is also loaded in the VOD system so that once a session is requested by and authorized for a specific subscriber terminal 50, a solution to a routing matrix 42 can be determined to find the appropriate VOD server 22 and QAM transport 46 serving the requester. This solution also considers dynamic issues such as which servers 22 the requested asset is loaded upon, and server loading/available slots in addition to the simpler, static solution to finding the first possible path to the requesting subscriber terminal 50.

In addition to solving the routing matrix 42 and provisioning the session with PIDs and PSI appropriate to follow the intended route, elements of the same information (program ID and QAM frequency) are also communicated to the session client at subscriber terminal 50 at the subscriber's premises so that the requested stream can be properly received and presented to the subscriber.

Clear VOD Distribution

Perhaps the simplest VOD distribution system implementation is a clear VOD distribution system, i.e. one that contains no encryption as depicted in FIG. 1. While not providing any safekeeping of what might be considered the entertainment medium's most valuable properties, namely current feature films, etc., clear VOD avoids many of the issues that the incumbent cable system providers to date have not adequately addressed and that introduction of a second, alternative CA system complicates even further still. Various arrangements for providing selective or full encryption in a VOD environment are discussed below. Throughout this discussion, it is instructive to carry an example VOD movie through the various embodiments to illustrate the relative storage efficiencies obtained with the various systems disclosed. A real world example of a VOD movie which will be used throughout this document has the following attributes:

Compressed video data rate: 3 Mbit/S
Movie length: 120 minutes (2 Hrs)
I-frame overhead: 17%
Total storage used for the video portion of a single, clear (unencrypted) copy of a film: 3.618 GBytes.

Pre-Encrypted VOD Distribution

Figure 3:
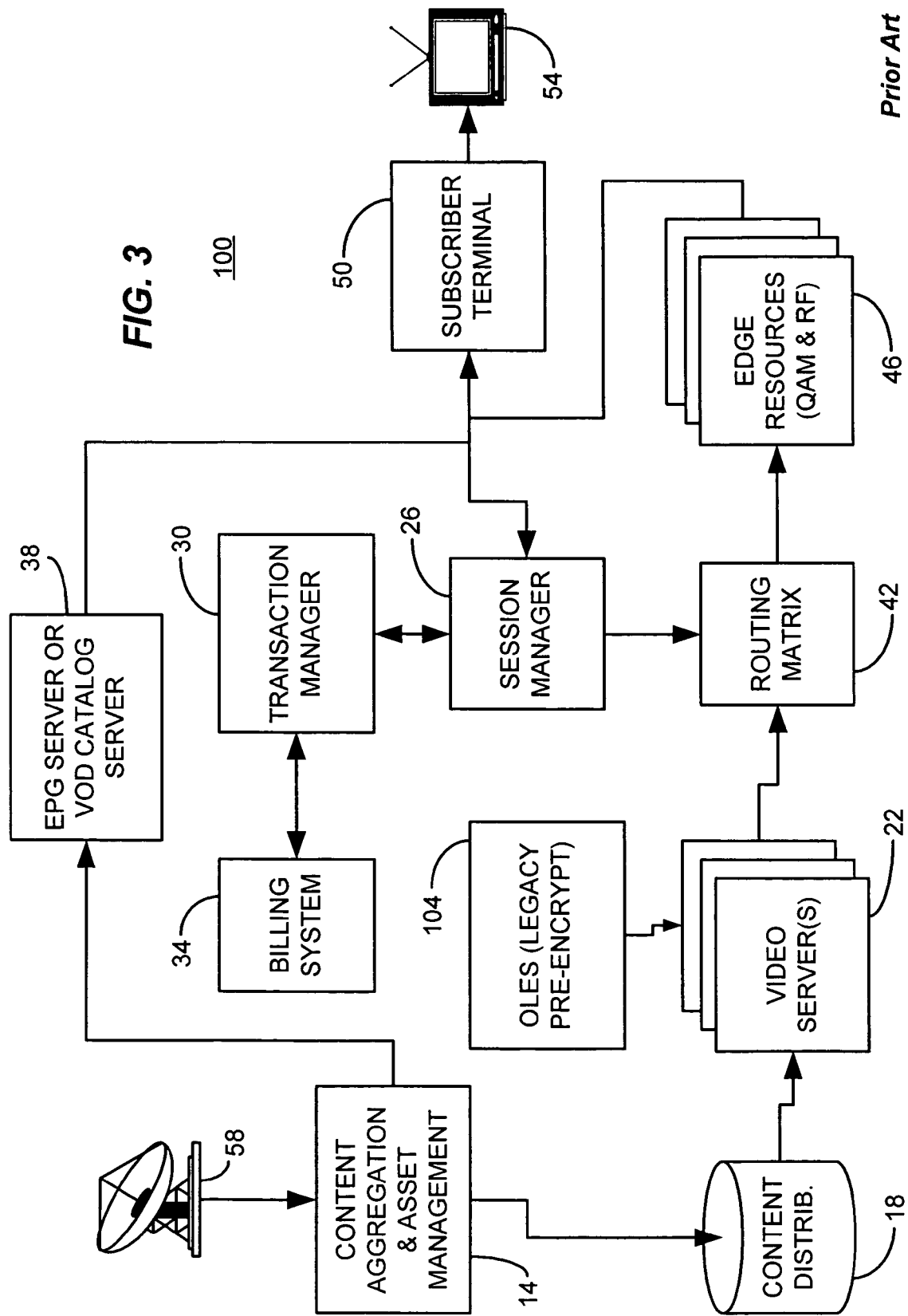
FIG. 3 is a block diagram of a pre-encrypted VOD system using a single (legacy) encryption system.

Pre-encrypted VOD systems such as system 100 shown in FIG. 3 can be architecturally similar to clear VOD distribution systems. One difference between the two is that on pre-encrypted systems there is pre-processing of the content prior to storage in the VOD system to provide safekeeping of content during the storage and distribution phases. This pre-processing can be carried out in pre-encryptor 104. Data security is implemented through storage of previously encrypted content within the video server(s) 22. While the clear VOD system contains directly viewable MPEG or other compressed A/V content on the server(s) 22, the pre-encrypted model stores this same content in a form that is only decipherable using a properly entitled subscriber terminal 50.

The pre-encryption process can be performed by the MSO at the time of deployment on the VOD system 100, prior to loading into the storage area network (SAN) used to propagate content to all of the video servers in the MSO's system. Alternatively, the encryption may be performed prior to receipt of the content by the MSO at an external service bureau, content aggregator or by the distributor or studio. In this case, the content is theoretically secured throughout the distribution phase, storage phase and transmission to subscriber for display on an authorized device. The use of pre-encryption prior to distribution of content to the MSO potentially adds to the complexity of entitlement distribution, separate from the content distribution, for installation on the VOD transaction manager 30 to allow bone fide subscribers to decrypt the purchased content. For purposes of this document, content will be considered stored in the VOD video server if it is stored either directly in the VOD video server or indirectly in the VOD video server (i.e., is accessible by the VOD video server).

Many pre-encrypted VOD architectures share one or more of the following common drawbacks:

- Additional handling of new content may be needed to perform the pre-encryption prior to loading into the server, either by the MSO or service bureau.
- Coordination and/or distribution is required for entitlements matching the access criteria used to encrypt the content stored in the server.
- Limited "shelf life" of the encryption keys used to secure the stored content, rendering decryption impossible at a later date.
- Incapability of present VOD video servers to load pre-encrypted streams.
- Incompatibility of pre-encrypted streams with present methods supporting trick mode play (fast-forward & rewind) on screen.
- One common key is used for all sessions accessing a particular program and it remains the same for the duration of time the content is in inventory on the server.
- According to MSOs familiar with the subject, pre-encrypted VOD streams are unsupported by conditional access technologies from certain manufacturer(s).

The issue regarding trick play and pre-encryption is based upon the concept that VOD servers 22 currently expect clear content and then subsequently identify the I-frames and store or otherwise segregate them for access in fast-forward or fast rewind playback modes, as described in conjunction with FIG. 2. If the stream is pre-encrypted prior to storage upon the server, it may be difficult or impossible for the server 22 to examine packet payloads to identify I-frames during the process of importation into the server 22 to create trick mode files 78 and 80 or associated indices. Many current systems will not accept streams for importation that are pre-encrypted.

Segregated Storage Pre-Encryption

A segregated storage mechanism can be physically similar to the architecture of the clear VOD distribution system. The content is encrypted in its entirety (100%) and a separate copy of the complete feature is stored for each different conditional access format supported by the MSO. The organization and configuration of the system is such that when a subscriber initiates a session on the server, the stream files for the selected content containing the CA format appropriate to the specific equipment deployed at the subscriber's premises requesting the session are spooled and delivered. This method offers a low system complexity encrypted VOD system but may suffer from some of the same issues common to other pre-encryption topologies, mentioned previously. In addition, a very significant storage penalty (one or more encrypted duplicate copies of the same movie) is incurred.

If one refers to the example movie scenario described above, the same movie using 3.618 GB of storage in the clear VOD state would require an additional 7.236 GBytes to store using segregated pre-encryption supporting two different CA systems.

Changes to the method employed by the VOD system are used for creating dynamic PSI data to implement this architecture supporting multiple CA systems. The VOD system session manager is made aware of which conditional access method is appropriate for a session requested by a specific subscriber. This information is in turn transferred to the video server that has been selected as the source for the session so that the appropriate PSI can be created for the session, including conditional access specific data. The video server is cognizant of the conditional access resources (ECMs) for each program stored on the server and these resources can be dynamically allocated on unique PIDs along with PIDs for the corresponding audio and video data. The PSI generated for each specific session, in addition to indicating the assigned PIDs for A/V, indicate the appropriate CASID, which is unique to each conditional access system provider and the PID assigned for the ECMs associated with the session.

Composite Storage Pre-Encryption

Composite storage is essentially the storage on the video server of a selectively encrypted stream such as a Passage™ processed stream that contains previously encrypted "critical packets" for a plurality (two or more) of independent conditional access systems (i.e., dual selective encrypted). The stream may be prepared identically to the processing of a selectively encrypted broadcast stream as described in the above-referenced pending patent applications, except that the resultant transport stream is recorded to a hard disk or other suitable computer readable storage medium, instead of being sent directly to a QAM modulator for HFC distribution to the requesting subscriber. As with other pre-encryption models, the content can be encrypted by either the MSO at time of deployment on the VOD system, a third party service bureau, by the studios themselves (the latter two cases being prior to receipt of the content by the MSO), or by or under control of other entities.

In this embodiment the small additional overhead in content storage (typically 2%-10% representing "critical packets" that are multiple encypted) is traded for the support of multiple independent CA formats without replication of entire streams. A negative aspect, in addition to those mentioned previously and common to other pre-encryption topologies, is the vulnerability of the prepared selectively encrypted stream to corruption by downstream equipment containing transport remultiplexing functionality that is not specifically designed to maintain the integrity of the selective encryption process applied to the stream.

If one refers to the example movie scenario described above, the same movie using 3.618 GB of storage in the clear VOD state would require approximately 3.690 GBytes to store using composite storage pre-encryption supporting two different CA systems with a critical packet "density" of 2%.

Certain changes to the method employed by the VOD system for creating dynamic PSI data can be used to implement this architecture. The VOD system session manager can be made to be aware of which conditional access method is appropriate for a session requested by a specific subscriber. This information is in turn transferred to the video server that has been selected as the source for the session so that the appropriate PSI can be created for the session, including conditional access specific data. The video server is cognizant of the conditional access resources (ECMs) for each program stored on the server and these can be dynamically allocated on unique PIDs along with PIDs for the corresponding audio and video data. The PSI generated for each specific session, in addition to indicating the assigned PIDs for A/V, can indicate the appropriate CASID, which is unique to each conditional access system provider and the PID assigned for the ECMs associated with the session.

Likewise, the video server dynamically allocates another set of PIDs for the shadow packets associated with the respective audio and video component streams for each session in the manner described in the above-referenced patent applications. This information can be included in the PSI sent in sessions requested by non-legacy clients. In total, eight different PIDs and corresponding data resources are dynamically allocated and managed by the server for each session: PAT (one table common to all sessions, but modified for each), PMT, Primary Video, Primary Audio, Shadow Video, Shadow Audio, Legacy ECM and Alternative ECM. Six of these entities can be stored in the embedded stream and use dynamic PID remapping for each session.

Consider the issue of which device to use in conjunction with performing the legacy encryption of the "critical" packets prior to storage on the VOD video server. If the legacy device is specially designed to process content destined for loading into a VOD video server, it may not accept a selectively encrypted stream at its input. The content format specified for VOD servers often uses a single program transport multiplex containing a single PAT entry, single PMT entry and service components, for one audio and one video stream. The shadow packets added in a composite selectively encrypted transport stream may prove problematic for a legacy VOD pre-encryption device, in certain instances. It is more probable that a device or process (since there are no real time requirements, an off-line process running on a PC or UNIX server may suffice) to process a candidate stream before passing through the legacy pre-encryptor and then post-encryption reconcile to extract only the encrypted "critical" packets for insertion into the VOD video server 22. The same or similar algorithms and techniques for performing this manipulation for selective encryption processing as described in the above-referenced patent applications can be adapted to VOD applications for off-line work.

The VOD server 22 may also be modified to allow introduction of streams having multiple service elements (primary video, primary audio, shadow video, shadow audio) uniquely associated with a Passage™ transport. The present video servers generally only allow one each, primary video and audio, respectively. The quartet of data representing Passage™ processed A/V content should preferably be managed as an indivisible set on the VOD video server 22.

Some additional bandwidth efficiencies may be obtained if, at the edge resources, shadow packets are removed from the composite streams in sessions serving legacy clients. Similarly, in certain embodiments, the edge resources, if selective encryption aware, could reinsert the shadow packets embedded in the stored stream in place of the legacy encrypted packets on the original program PID. These improvements would result in no carriage overhead for support of multiple conditional access systems on a single transport.

Hybrid Composite Storage Pre-Encryption

Figure 4:
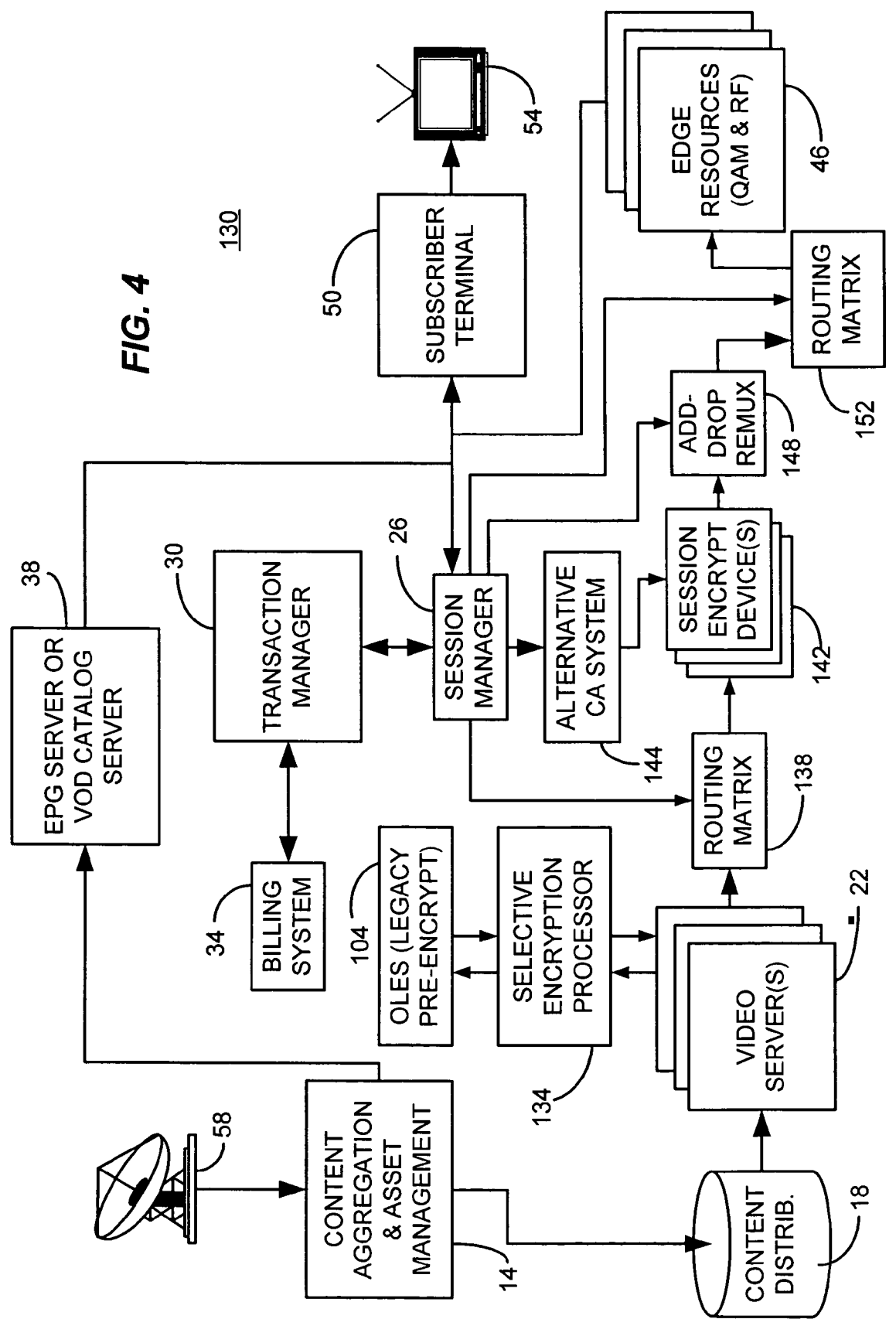
FIG. 4 is a block diagram depicting a hybrid composite VOD system architecture consistent with certain embodiments of the present invention.

Hybrid composite storage is a variant of the composite storage concept, but incorporates elements of session-based encryption for implementing the alternative conditional access encryption. In this scenario, depicted as system 130 of FIG. 4, the legacy "critical" packets, comprising approximately 2-10% of the total content, are pre-encrypted by the legacy conditional access system 104 using selective encryption technology for managing the process. The selective encryption is managed in selective encryption processor 134. The duplicate copy of "critical" packets, which are located on previously unused PIDs, is left unencrypted. This latter aspect is the departure from the composite storage scenario described above. The composite stream of unencrypted non-critical packets, legacy encrypted "critical" packets on the original service PIDs and an unencrypted, duplicate copy of the "critical" packets on alternate service PIDs is stored on the video server 22 as a single stream.

Upon playback to a subscriber session, if the session is destined for a legacy STB (represented by subscriber terminal 50), the existing paradigm for pre-encrypted content is followed and no special action is taken. The stream is routed at routing matrix 138 operating under control of session manager 26, through a session encryption device 142 capable of performing encryption using the alternative conditional access system 144, but the session manager 26 does not provision the device to perform encryption on elements of the stream and it is sent directly to the requesting subscriber without further modification. To maintain security of the outgoing stream and to reduce the bandwidth of the session for legacy sessions, the stream is processed through an add-drop remultiplexer 148 and the clear "critical" content on alternate service PIDs are removed from the outgoing transport. The output stream is then routed at routing matrix 152 to appropriate edge resources 46 for delivery to the subscriber terminal 50. In one embodiment, the session encryption device 142 that performs encryption using the alternative conditional access system also contains the add-drop multiplexer capability. Other variations will also occur to those skilled in the art upon consideration of the present teaching.

If, on the other hand, the session is destined for a non-legacy STB (also as represented in this illustration by subscriber terminal 50), the stream is routed through session encryption device 142 capable of performing encryption using the alternative conditional access system and only the "critical" packets on alternate service PIDs (previously in the clear) are encrypted using the alternative conditional access system 144, as provisioned by the session manager.

Some additional bandwidth efficiencies may be obtained for these non-legacy sessions, if the edge device is selective encryption aware, by reinserting the shadow packets embedded in the stored stream, now encrypted, in place of the legacy encrypted packets on the original program PID. This improvement would result in no carriage overhead for support of multiple conditional access systems on a single transport.

In certain embodiments, a preprocessor can be used to perform selective encryption of content to be loaded onto the video server. A modified file protocol can be used to allow the video server to import and associate-these files. Either the preprocessor or the video server can be designed to perform the indexing. An alternate instantiation could be use to perform all selective encryption pre-processing (e.g., PID mapping and packet duplication) within the VOD video server 22 itself. This could be accomplished by modifying the VOD video server 22 application to add a pre-processor task as a separate executable, called by the VOD video server 22 during the process to prepare content for pre-encryption.

Changes can be implemented to the method employed by the VOD system for creating dynamic PSI data to implement this architecture. The VOD system session manager 26 is made aware of which conditional access method is appropriate for a session requested by a specific subscriber. This information can in turn be transferred to the VOD video server 22 that has been selected as the source for the session so that the appropriate PSI can be created for the session, including conditional access specific data. The VOD video server 22 is cognizant of the conditional access resources (ECMs) for each program stored on the server and these can be dynamically allocated on unique PIDs along with PIDs for the corresponding audio and video data. The PSI generated for each specific session, in addition to indicating the assigned PIDs for A/V, can indicate the appropriate CASID, which is unique to each conditional access system provider and the PID assigned for the ECMs associated with the session.

Likewise, the VOD video server 22 dynamically allocates PIDs for the shadow packets associated with the respective audio and video component streams for each session. This information is included in the PSI sent in sessions requested by non-legacy clients. Just like in the more general composite storage architecture discussed in the previous section, the video server manages multiple resources and PIDs. The hybrid topology reduces the unique entities by one from eight to seven: there is no need for alternative ECM PID or data resource in the stored composite stream. This information will be added later in a downstream device providing the alternative conditional access encryption for those sessions destined for decoding upon a non-legacy client.

Re-Encrypted Distribution

Figure 5:
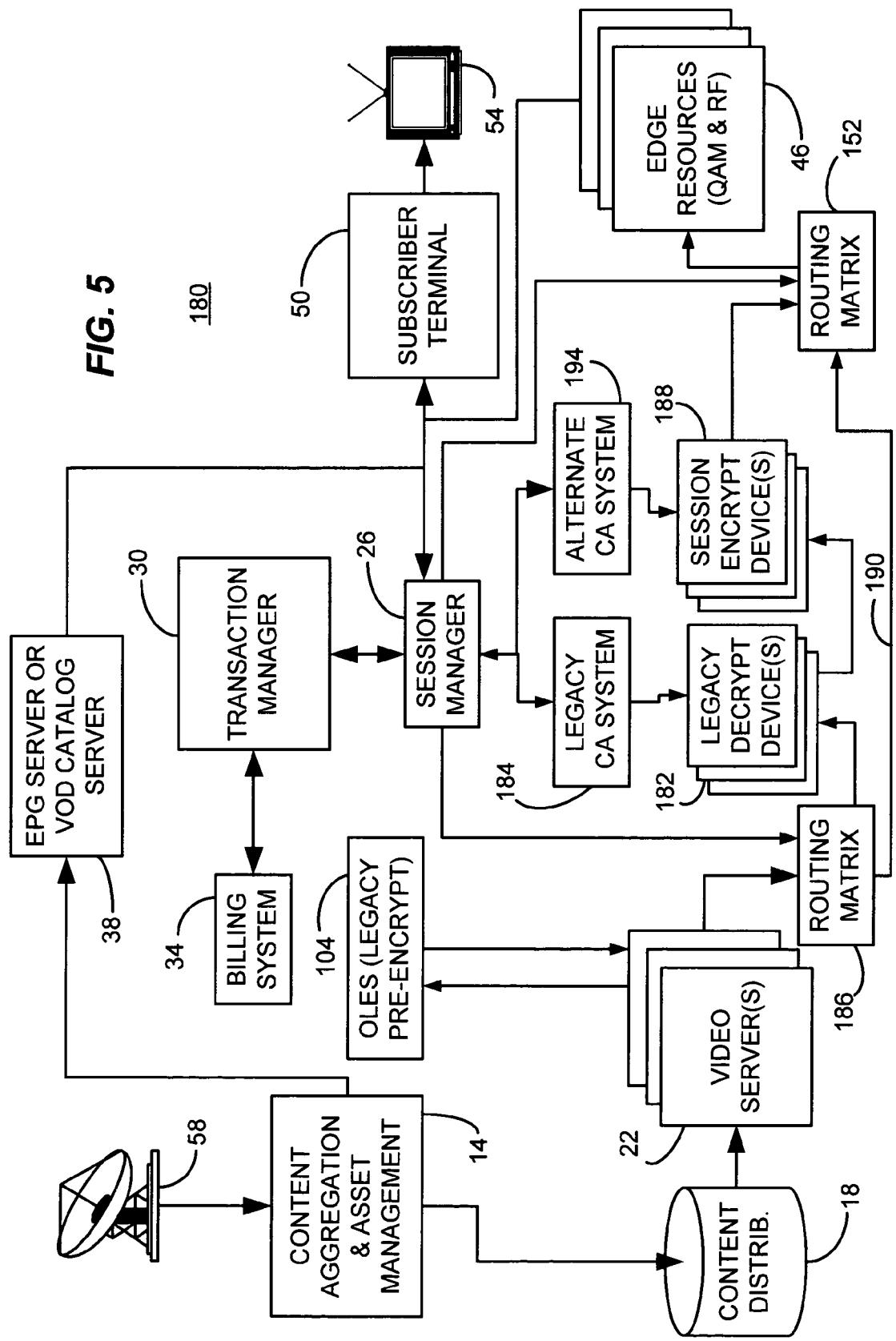
FIG. 5 is a block diagram of a re-encrypted VOD architecture consistent with certain embodiments of the present invention.

A hybrid approach is provided in a re-encrypted distribution architecture. This topology leverages the paradigms established for pre-encrypted content preparation, storage, management, etc. but adds support for session based encryption for the alternative conditional access systems added to an existing incumbent system. Referring to the exemplary embodiment of FIG. 5, a legacy decryption device 182, operating to decrypt using the legacy CA system 184, is added to the transport stream path exiting the VOD video server 22 (via routing matrix 186). After the decryption device 182, the transport stream passes through a contemporary session based encryption device 188 based upon the alternate CA system. The VOD session manager 26, on a session-by-session basis, determines which sessions will pass through the decryption device 182 intact and be modulated and transmitted to the subscriber unaltered. A path 190 between the routing matrices preserves the pre-encrypted content and delivers it to subscribers having legacy equipment. In either case, the output stream passes through routing matrix 152 to the appropriate edge resources for delivery to the subscriber terminal 50.

Alternatively, the VOD system session manager 26, through interaction with both legacy CA system 184 and alternate CA system 194, can both actuate the decryption device 182 and activate session based encryption device 188 for a particular session, thereby supporting subscribers with non-legacy equipment at their premises. Thus, this system 180 can support either legacy or non-legacy (alternate CA) encryption.

Certain embodiments of this architecture support pre-encryption on legacy systems not presently supporting session-based encryption, while providing the ability to deliver session based encryption for the alternative CA system 194 integrated into the existing legacy network. Certain embodiments of this architecture may face some of the same issues as mentioned previously and common to other pre-encryption topologies. In addition, it experiences the additional cost burden of a legacy decryption element and the challenges of dynamically configuring and operating such a device. There may be additional costs faced in a specific deployment for switching and routing equipment that may be necessary to move transport streams "around" the legacy decryption device. However, this architecture permits storage of fully encrypted content to safeguard the content while enabling dual encryption without storage penalty.

Changes can be made to the method employed by the VOD system for creating dynamic PSI data to implement this architecture. The VOD system session manager 26 can be made aware of which conditional access method is appropriate for a session requested by a specific subscriber. This information is in turn transferred to the video server that has been selected as the source for the session so that the appropriate PSI can be created for the session, including conditional access specific data. The video server can be made to be cognizant of the conditional access resources (ECMs) for each program stored on the server and these can be dynamically allocated on unique PIDs along with PIDs for the corresponding audio and video data. The PSI generated for each specific session, in addition to indicating the assigned PIDs for A/V, indicate the appropriate CASID, which is unique to each conditional access system provider and the PID assigned for the ECMs associated with the session.

In this example, the same movie using 3.618 GB of storage in the clear VOD state would require 3.618 GBytes to store using re-encryption supporting two different CA systems.

Thus, in certain embodiments consistent with the present invention, a method of storage and distribution of video-on-demand content, involves receiving a request from a subscriber terminal to transfer the selection of video content to the subscriber terminal; determining that the subscriber terminal is able to decrypt content encrypted under the first encryption system or under a second encryption system; if the subscriber terminal is able to decrypt the content encrypted under the first encryption system, then routing a selection of content that has been encrypted under the first encryption system to the subscriber terminal; if the subscriber terminal is able to decrypt the content encrypted under the second encryption system, then: a) decrypting the selection of content encrypted under the first encryption system to produce clear content; b) encrypting the selection of content under the second encryption system to produce a re-encrypted selection of content; and c) routing the re-encrypted selection of content to the subscriber terminal.

In other words, a method of storage and distribution of video-on-demand content consistent with certain embodiments involves receiving a request from a subscriber terminal 50 to transfer the selection of video content to the subscriber terminal 50. If the subscriber terminal is able to decrypt the content encrypted under the first encryption system, the encrypted content is routed to the subscriber terminal 50. If the subscriber terminal is able to decrypt the content encrypted under the second encryption system, the content is first decrypted and then re-encrypted under the second encryption system before routing to the subscriber terminal 50.

Dynamic Composition Pre-Encryption

Figure 6:
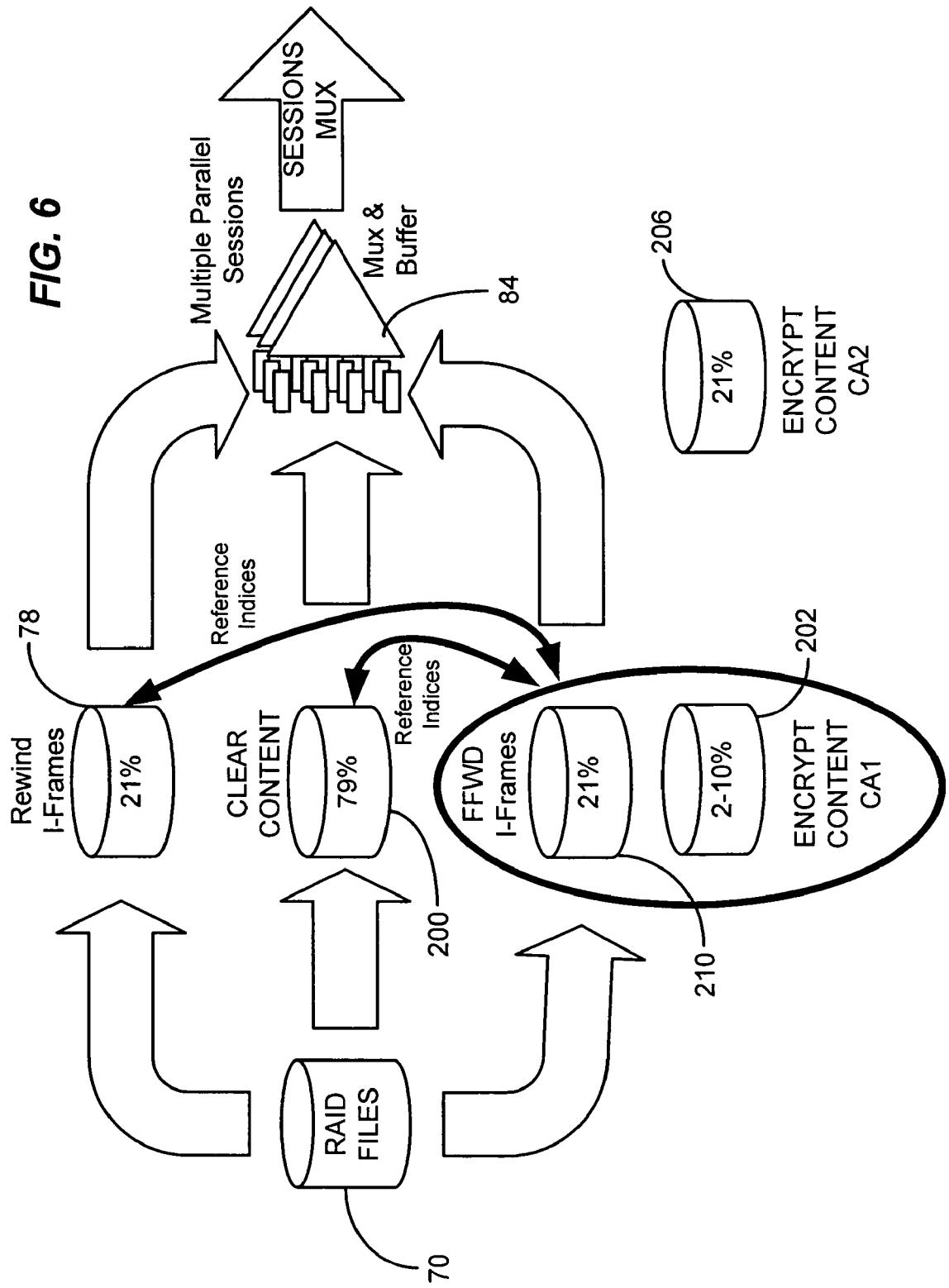
FIG. 6 illustrates a dynamic composition pre-encrypted VOD architecture consistent with certain embodiments of the present invention.

Another pre-encrypted VOD architecture consistent with certain embodiments of the present invention is dynamic composition pre-encryption. In this scheme, each program or movie is stored in three or more elements on the VOD video server 22. Referring to FIG. 6, clear content is stored at 200. Critical packets are selected according to a suitable selection criterion associated with the selective encryption process. Thus, the content that is stored has either "critical" packets or non-critical packets. The "critical" packets generally constitute approximately 2% to 10% of the program (depending upon program content and the selection criteria used to select packets for encryption) and are encrypted. A separate copy of the critical content is maintained for each conditional access system supported by the MSO. In this illustration, for example, the critical packets associated with a first CA system (CA1) is stored at 202 while encrypted content associated with CA 2 is stored at 206. By using a selection criterion that involves selection of certain I-frames, the fast forward I-Frames can be made to incorporate the encrypted content and stored together as encrypted I-frames 210 (and 206). The packets in both the "critical" packet fast forward file 210 as well as the clear (unencrypted), non-critical packet file 200 are indexed to maintain temporal correlation between the two files. These indices either may be monotonic packet counts from start of stream or calculated packet offsets from the last PCR.

When a subscriber session is initiated, the main file 200 containing the clear content, less "critical" and fast forward packets, is queued in the video server for playout. In addition, the file containing the "critical" and fast forward packets 210, pre-encrypted in the CA format appropriate for the CPE of the subscriber requesting the session, is also queued for playout. When the program playback is started, the video server reconstructs a single program multiplex in its stream buffer feeding the outgoing transport the correct sequence of packets based upon the indices in the two component files. Although, in general, only about 2-10% of the packets are encrypted in a selective encryption system according to the above pending patent applications, even further security is provided by encryption of all of the I frames in the present embodiment. Rewind I-frames can be stored either as encrypted or unencrypted packets. A dual selective encrypted embodiment is depicted in FIG. 7.

Figure 7:
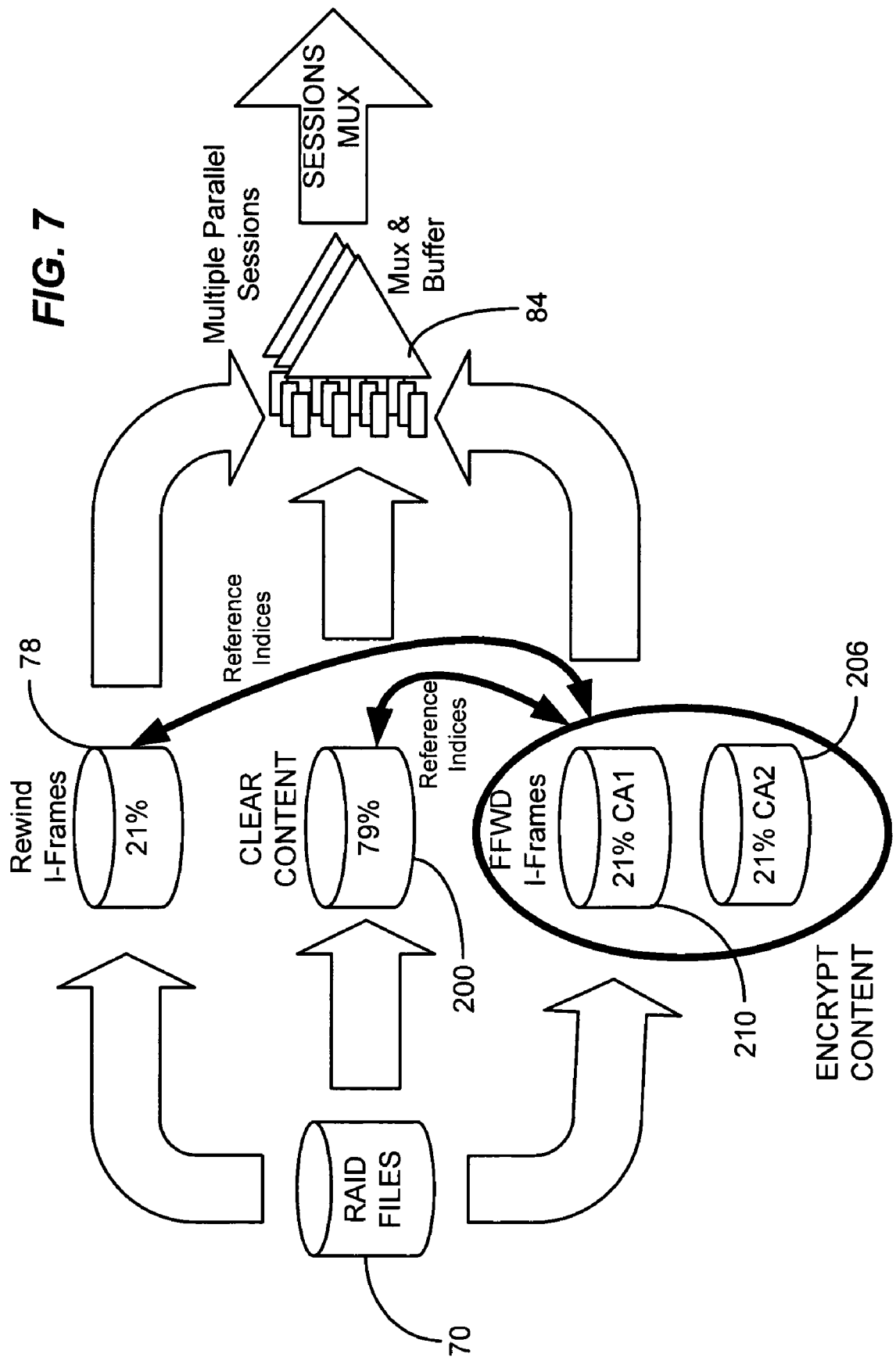
FIG. 7 also illustrates a dynamic composition pre-encrypted VOD architecture consistent with certain embodiments of the present invention.

While the external composition and data flow appears similar to the clear VOD system depicted in FIG. 1, the internal architecture of the video server changes significantly, as shown in the exemplary storage architecture of FIG. 6 and FIG. 7.

Certain embodiments of this method offer several distinct advantages that may not be readily apparent. The stream files containing "critical" packets may be the same one as the extracted subfile containing all I-frames for "trick" modes, as was described previously in the general discussion of VOD system architecture. If this opportunity is taken, then a storage economy can be realized over all pre-encrypted schemes including traditional (unencrypted) VOD, as deployed today. The traditional VOD video server has three files for each feature or movie: two containing just I-frames (one in reverse order) and one containing the complete original copy. Research on encoded streams conducted by Sony has shown that the I-frames typically represent between 12%-21% of the total content, typically around 17%. With the dynamic composition method, if the "critical" packet files are chosen to contain complete I-frames, a separate file of critical data used solely for encryption purposes is no longer necessary, saving 2% to 10% storage for this method. In addition, since this method removes the redundant I-frames from the clear stream file, an additional (nominal) 17% storage savings is also realized. This indicates a potential 27% nominal (31% maximum) video server disk storage savings for a single CA system model over the composite storage model VOD system described above.

When compared to the segregated storage model described above, one entire duplicate copy of a program can be eliminated and the addition of one additional CA format adds no storage or bandwidth overhead when compared to a traditional clear VOD server implementation. The reason for the "free" second CA format is that the 17% nominal storage saving realized by using the same I-frame file for both fast forward "trick" modes and "critical" content used for selective encryption is consumed by replicating just the I-frame file and encrypting it with the alternative CA format.

Dynamic Composition Pre-Encryption with Forward and Reverse Indexing

Figure 8:
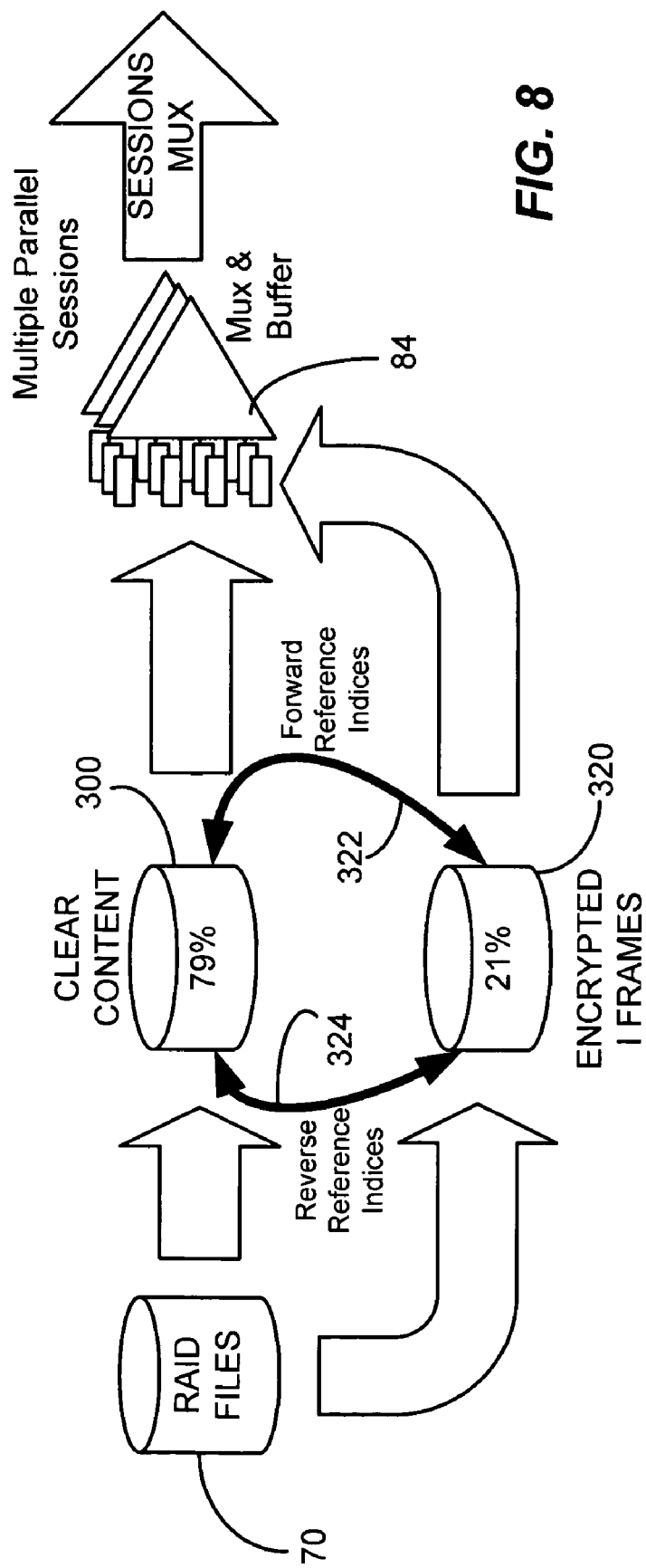
FIG. 8 illustrates a dynamic composition pre-encrypted VOD architecture using dual trick play indices consistent with certain embodiments of the present invention.

If one takes the concept of dynamic composition pre-encryption described above one step further, the current convention in VOD systems to store the same I-frames of a movie in forward and reversed sequence to allow fast forward and rewind "trick" modes can be eliminated. An illustration of this concept is shown in the example of FIG. 8. These dual files for forward and reverse are replaced by a single file 320 of I-frames in normal forward sequence with two sets of indices, one set 322 for playing the I-frame file in forward order and one set 324 for playing the I-frame file in reverse order. The appropriate sets of indices are chosen depending on whether forward or reverse high-speed motion is desired. The forward indices are also used to reconstruct the normal speed stream when matching the I-frame file to the non-critical content file to reconstruct the entire stream. On a clear or re-encrypted VOD system, this will allow up to about 21% storage savings. On a composite pre-encrypted storage system, up to about 42% storage savings may be realized.

It is noted that although the arrangement of FIG. 7 provides substantial savings in storage space over the techniques currently in use, additional savings in storage space can be realized by the recognition that the information stored in the trick mode content file is redundant to the I frames stored in the normal play content file 200. By spooling normal play content from both files, an additional savings of up to approximately 21% can be realized as depicted in FIG. 8. In this illustration, all I-frame data (intra-coded data) are stored in the trick mode content file 320, and supplemental normal play content (inter-coded data, B and P frame data) is stored in the normal play content file 300. The bidirectional indices concept is extended for even further storage economy in this embodiment. If one recognizes that the normal mode playback file contains a duplication of the same I-frames played in "trick" modes, a dynamic architecture can be created to remove any redundant I-frame content from the normal mode playback file. During normal playback, the two files are "blended" (normal play and "trick"

modes), while only the I-frame sequences in the "trick" mode file are accessed during fast forward, fast reverse (rewind), etc.

Thus, according to certain embodiments consistent with the present invention, a method of processing digital video content, wherein the digital video content comprises intra-coded frames and inter-coded frames, involves selecting a plurality of the intra-coded frames for encryption to produce selected frames; encrypting the selected frames under a first encryption algorithm to produce first encrypted frames; storing the inter-coded frames in a first file; and storing the intra-coded frames, whether encrypted under the first encryption algorithm or unencrypted, in a second file. For a multiple encryption embodiment consistent with the present invention, the method further involves duplicating the intra-coded frames; encrypting duplicates of the selected frames under a second encryption algorithm to produce second encrypted frames; storing the intra-coded frames, whether encrypted under the second encryption algorithm or unencrypted, in a third file.

As noted above, the current convention in VOD systems to store the same I-frames of a movie in forward and reversed sequence to allow fast forward and rewind "trick" modes can be eliminated. An illustration of this concept is shown in the example of FIG. 8. These dual files for forward and reverse are replaced by a single file 320 of I-frames in normal forward sequence with two sets of indices, one set 322 for playing the I-frame file in forward order and one set 324 for playing the I-frame file in reverse order, or equivalently, by a single index that is traversed in the forward or reverse direction for FF or FR play respectively. The appropriate sets of indices are chosen depending on whether forward or reverse high-speed motion is desired. The forward indices are also used to reconstruct the normal speed stream when matching the I-frame file to the non-critical content file to reconstruct the entire stream. On a clear or re-encrypted VOD system, this will allow up to about 21% storage savings. On a composite pre-encrypted storage system, up to about 42% storage savings may be realized.

If the "trick" mode subfile and the "critical" data encrypted content file can be the same, the content is selectively encrypted up to approximately a nominal 17% level (~21% max), much higher than the commonly proposed Passage™ encryption level of approximately 2%, but carrying no inherent storage or system capacity costs, as do other schemes. It should be noted that all or only selected ones of the I frames can be encrypted according to certain embodiments consistent with the present invention. For this system to work, some changes to the video server software design might be necessary, but these changes would be modifications to the existing processes and would not require substantial new development on the part of the server vendor.

In the example of FIG. 8, either two reference tables or one could be used in implementing various embodiments consistent with this example. In this example, however, it should be remembered that the normal play file does not contain a full set of content, but rather may contain only data associated with intra-coded frames. Thus, to carry out a normal playback, the index tables are used to identify a full set of data and data are pulled from both file 300 and file 320.

In any case, the indices can be visualized as a table such as TABLE 1 and TABLE 2 below. In the case of the using a forward and a reverse index, TABLE 1 represents the forward index and TABLE 2 represents the reverse index.

TABLE 1

(322)

| File pointers in Normal Play File arranged in descending order File pointers point to intra-coded data | File pointers in Trick Play File arranged in descending order File pointers point to inter-coded data |
|---|---|

TABLE 2

(324)

| File pointers in Normal Play File arranged in descending order File pointers point to intra-coded data | File pointers in Trick Play File arranged in ascending order File pointers point to inter-coded data |
|---|---|

When a subscriber is playing a file in a normal playback mode, data are spooled sequentially by alternating retrieval of data from the Normal Play File 300 and the Trick Mode File 320. When a trick play mode of fast forward is initiated, a location in the Trick Mode File 320 is identified by finding the closest file pointer corresponding to the current file pointer by reference to TABLE 1. Data are then spooled only from the trick play file in the order dictated by the file pointers in TABLE 2.

In a similar manner, when a subscriber is playing a file in a normal playback mode, data are spooled sequentially from both the Normal Play File 300 and the Trick Mode File 320. When a trick play mode of fast reverse is initiated, a location in the Trick Mode File 320 is identified by finding the closest file pointer to the current playback point by reference to TABLE 2. Data are then spooled from the trick play file in the order dictated by the file pointers in TABLE 2.

In either case, when the subscriber returns to normal play mode, the current file index in the Trick Mode File 320 is used as a starting location for normal play. Data are then pulled from both files 300 and 320 to produce normal playback. It is noted that there is no overlap in the locations between the Normal Play file index and the Trick Mode indices. Playback will generally alternate between playing one or more I frames from file 320 and playing one or more B or P frames from file 300 to construct a complete set of the content.

As noted earlier, a similar result can be achieved with a single set of file indices such as that shown in TABLE 3 (The trick play file pointers could be either ascending or descending.). In this example, fast forward trick play is achieved by playing out the trick play file 320 in the forward direction of the file pointers (top to bottom), and fast reverse trick play is achieved by playing out the trick play file 320 in the reverse direction of the file pointers (bottom to top). Again, normal playback involves selecting data from both files.

TABLE 3

| File pointers in Normal Play File arranged in descending order File pointers point to intra-coded data | File pointers in Trick Play File arranged in descending order File pointers point to inter-coded data | FF  FR |
|---|---|---|

Figure 9:
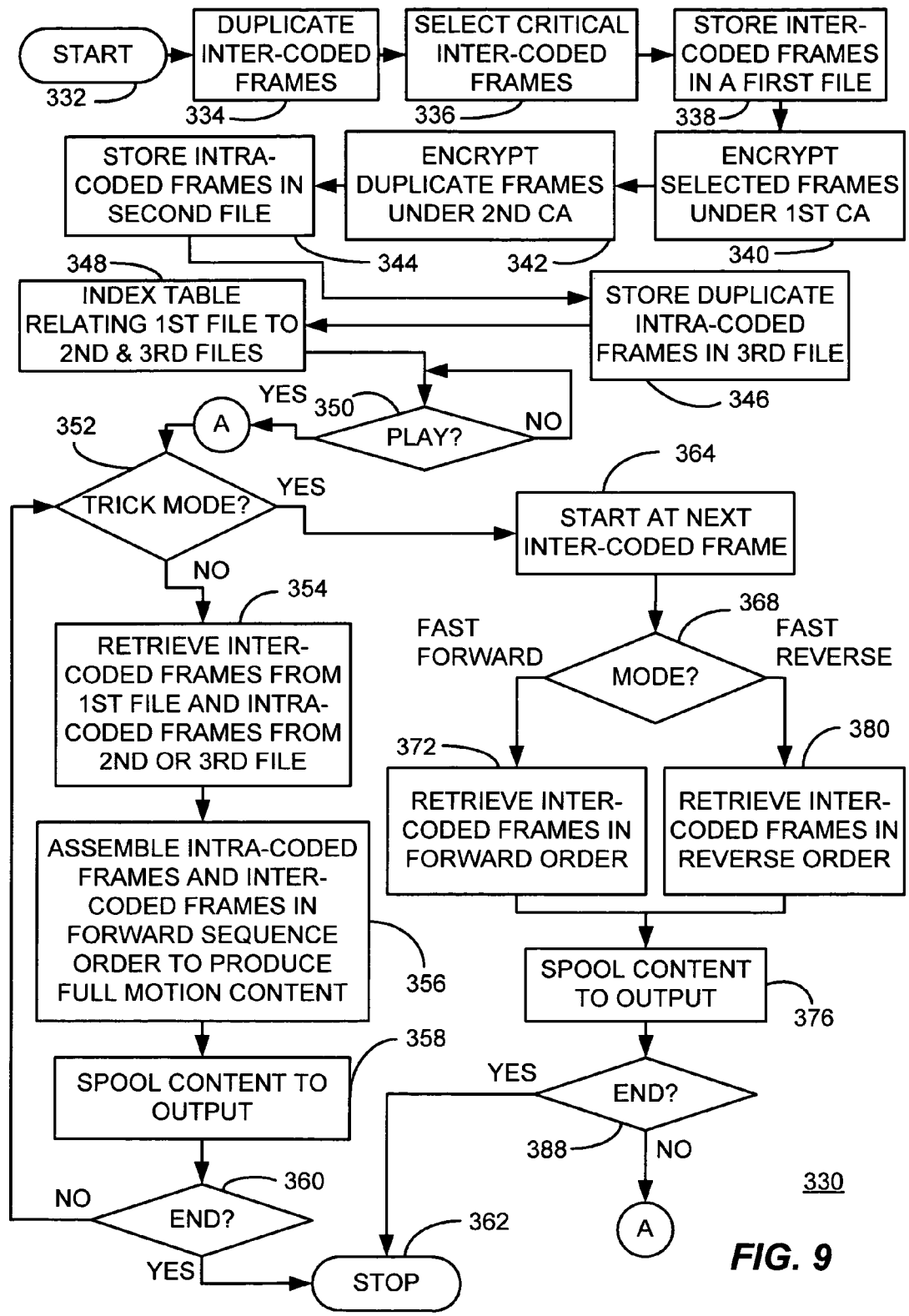
FIG. 9 is a flow chart of a first exemplary process consistent with certain embodiments of the present invention.

A process 330 for playback of content using the arrangement depicted in FIG. 8 is shown in FIG. 9 starting at 332. At 334, intra-coded frames are duplicated. At 336, "critical" intra-coded frames are selected for encryption. The inter-coded frames are stored in a first file (300) at 338. At 340, the selected frames are encrypted under the first CA encryption system. For multiple encryption systems, at 342 the duplicate frames are encrypted under a second CA encryption system. At 344 the intra-coded frames are stored in a second file and at 346, the duplicate intra-coded frames are stored in a third file. All or only part of the I frames may be encrypted within the second and third files. One or more index tables are created and stored that relate the first file to the second file and the first file to the third file at 348. In this example, a single index table is depicted. When a subscriber initiates a playback at 350, a determination of playback mode is made at 352. If a normal playback mode has been invoked at 352, inter-coded frames from the first file and intra-coded frames from either the second or the third file (depending upon the decryption ability of the subscriber terminal 50) are retrieved at 354 and assembled in forward sequence at 356 to produce full motion content. This content is then spooled to the output at 358 until the end is reached at 360 in which case the process stops at 362. If the end is not reached, control returns to 352 on a periodic or frequent basis to determine if the subscriber has invoked a trick mode.

If a trick mode has been invoked at 352, a location in the second file or third file (depending upon the decryption ability of the subscriber terminal 50) is identified, by reference to TABLE 3, that is close to the current point of playback (e.g., the next inter-coded frame) at 364. If a fast forward trick mode has been invoked at 368, control passes to 372 where intra-coded frames are retrieved in forward order from the second or third file. If fast reverse trick mode has been invoked, control passes from 368 to 380 where intra-coded frames are retrieved in reverse order from the second or third file. In either case, the retrieved frames are spooled to the output at 376. If the end of the file is reached at 388, the process stops at 362. Otherwise, control passes back to 352 to monitor the state of the selection of trick mode and either continue to operate in trick mode, change from one trick mode to the other or return to normal playback mode.

Many variations in this process are possible without departing from certain embodiments consistent with the present invention. For example, the ordering of certain actions can be rearranged without changing the basic operation. Also, equivalently, two tables such as TABLE 1 and TABLE 2 could be used. In this equivalent example, instead of designating an order of retrieval from the second or third file, the order is always in the same direction, but with reference to a different table. Also in this variation, the tables used to determine entry points in the files for normal playback depends upon the trick mode selected, thus a mode determination is made to determine which table to use. Other variations will also occur to those skilled in the art upon consideration of the present teaching.

Figure 10:
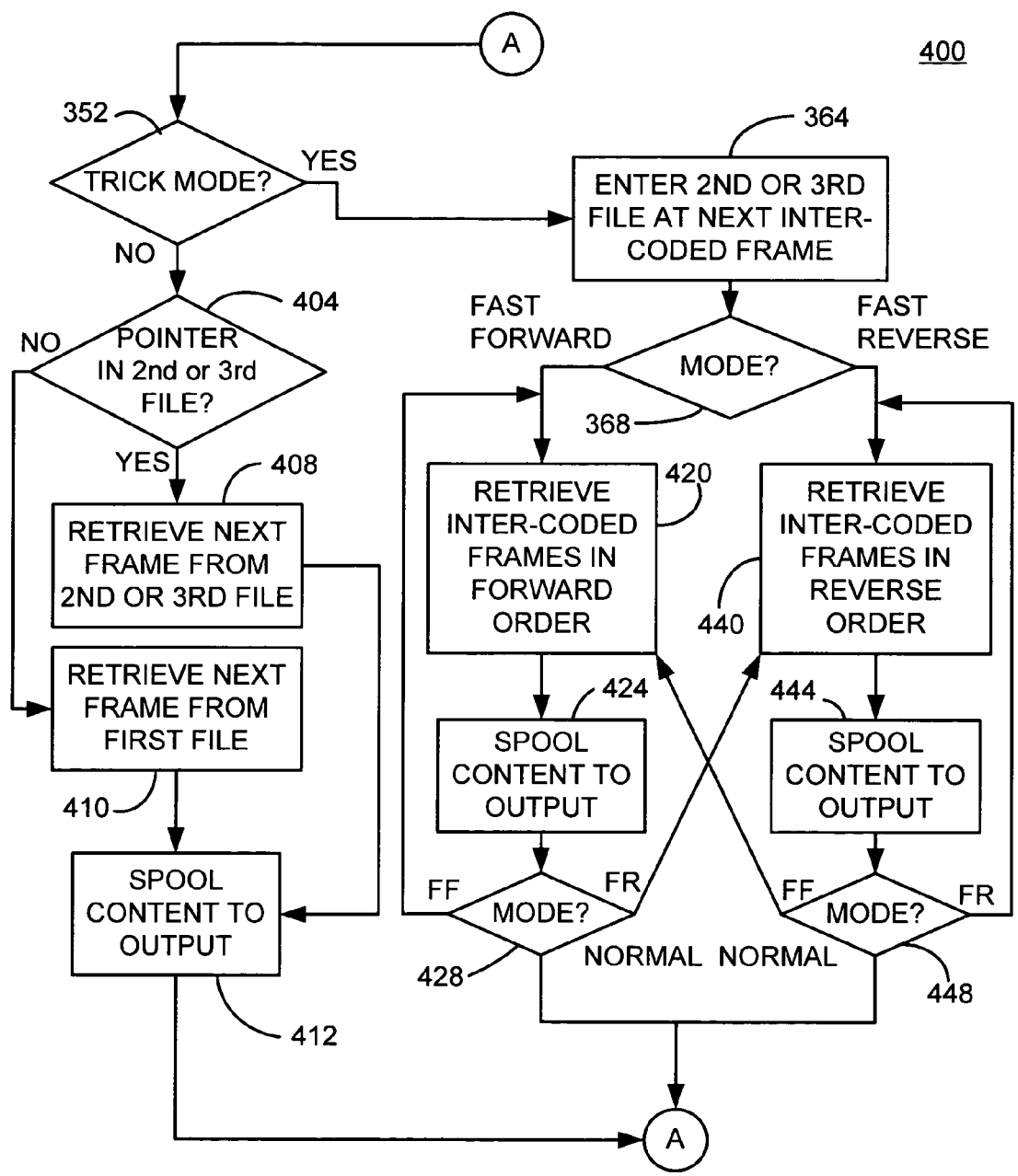
FIG. 10 is a flow chart of a second exemplary process consistent with certain embodiments of the present invention.

FIG. 10 shows another embodiment of a playback process similar to that of FIG. 10, but detailing certain variations. In this embodiment, processes preceding 352 are the same or similar to those of FIG. 9. Also, to simplify the diagram, the end of file operation has been omitted, but adding it will be clear to those skilled in the art upon consideration of the present teaching.

In the normal play mode decision from 352, a determination is made as to whether or not the first (or next) frame for playback is located in the second or third file (depending upon the decryption capability of the subscriber terminal). If so, the next frame is retrieved from the second or third file at 408. If not, the next frame is retrieved from the first file at 410. In either event, the retrieved frame is spooled to the output at 412 and control returns to 344 to determine if a mode change has taken place. In other words, the presence or absence of an entry in the second or third file that corresponds to a next frame in the content is used to determine if content is retrieved from the first file at 410 on one hand or the second or third file on the other hand at 408.

When a fast forward trick mode is invoked at 368, intra-coded frames are retrieved from the second or third file (again depending upon the decryption ability of the subscriber terminal) in forward order at 420 and the frame is spooled to the output at 424. If no mode change occurs at 428, the process returns to 420 to retrieve the next frame. If the mode changes to normal playback mode at 428, control returns to 344.

If a fast reverse trick mode is invoked at 368, intra-coded frames are retrieved from the second or third file in reverse order at 440 and the frame is spooled to the output at 444. If no mode change occurs at 448, the process returns to 440 to retrieve the next frame. If the mode changes to normal playback mode at 448, control returns to 344.

If the mode changes to fast reverse at 428, control is passed to 440. If the mode changes to fast forward at 448, control passes to 420.

Again, many variations in this process are possible without departing from certain embodiments consistent with the present invention. For example, the ordering of certain actions can be rearranged without changing the basic operation, and end of file provisions should be provided. Also, equivalently, two tables such as TABLE 1 and TABLE 2 could be used. In this equivalent example, instead of designating an order of retrieval from the second or third file at 420 and 440, the order is always in the same direction, but with reference to a different table. Also in this variation, the tables used to determine entry points in the files at 364 and for normal playback depends upon the trick mode selected, thus a mode determination is made at 364 to determine which table to use. Other variations including error trapping as well as other considerations will also occur to those skilled in the art upon consideration of the present teaching.

A preprocessor can be used to perform selective encryption of content to be loaded onto the VOD video server 22. A modified file protocol can be used to allow the VOD video server 22 to import and associate these files. Either the preprocessor or the VOD video server 22 can be used to perform the indexing. An alternate instantiation can be used to perform all selective encryption pre-processing within the video server itself. This can be accomplished by modifying the video server application to add a pre-processor task as a separate executable, called by the server during the process to prepare content for pre-encryption.

Additionally, in certain embodiments, this method overcomes the classic pre-encryption issue of supporting trick modes, but retains the other common problems of encryption "shelf life" and the additional handling required to prepare the stream for use on the VOD system.

Changes to the method employed by the VOD system for creating dynamic PSI data can be used to implement this architecture. The VOD system session manager 26 is made to be aware of which conditional access method is appropriate for a session requested by a specific subscriber in order to select the appropriate "critical" data file for the session. This information is in turn transferred to the VOD video server 22 that has been selected as the source for the session so that the appropriate PSI can be created for the session, including conditional access specific data. The VOD video server 22 is cognizant of the conditional access resources (ECMs) for each program stored on the server and these must be dynamically allocated on unique PIDs along with PIDs for the corresponding audio and video data. The PSI generated for each specific session, in addition to indicating the assigned PIDs for A/V, indicates the appropriate CASID, which is unique to each conditional access system provider and the PID assigned for the ECMs associated with the session.

If one refers to the example movie scenario described above, the same movie using 3.618 GB of storage in the clear VOD state would require 3.159 GBytes to store using dynamic composition pre-encryption supporting two different CA systems—a savings of almost 0.5 GB.

In accordance with certain embodiments consistent with the present invention, certain of the functional blocks used to implement the VOD system can be implemented using a programmed processor such as a general purpose computer. One example of such a functional block is the session manager 26. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Certain embodiments described herein, are or may be implemented using a programmed processor executing programming instructions that are broadly described above in flow chart form that can be stored on any suitable electronic or computer readable storage medium and/or can be transmitted over any suitable electronic communication medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

Those skilled in the art will appreciate, upon consideration of the above teachings, that the program operations and processes and associated data used to implement certain of the embodiments described above can be implemented using disc storage as well as other forms of storage such as for example Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies without departing from certain embodiments of the present invention. Such alternative storage devices should be considered equivalents.

Thus, in certain embodiments consistent with the present invention, a computer readable storage device for storing digital video content has at least one computer readable storage medium. A first file is stored on the storage medium containing un-encrypted inter-coded frames of the digital video content. A second file is stored on the storage medium containing intra-coded frames of the digital video content encrypted under a first encryption algorithm. A third file is stored on the storage medium containing intra-coded frames of the digital video content encrypted under a second encryption algorithm. A first reference table relates frames in the first file to frames in the second file. A second reference table relates frames in the first file to frames in the third file.

While certain illustrative embodiments have been described, it is evident that many alternatives, modifications, permutations and variations will become apparent to those skilled in the art in light of the foregoing description.

What is claimed is:

1. A method of processing digital video content in a video-on-Demand (VOD) system, wherein the digital video content comprises unencrypted intra-coded frames and inter-coded frames, the method comprising:
   duplicating the unencrypted intra-coded frames;
   selecting a plurality of the unencrypted intra-coded frames for encryption to produce selected frames;
   encrypting the selected frames under a first encryption algorithm to produce first encrypted frames;
   encrypting the duplicates of the unencrypted selected frames under a second encryption algorithm to produce second encrypted frames;
   storing the inter-coded frames in a first file;
   storing the intra-coded frames, whether encrypted under the first encryption algorithm or unencrypted, in a second file; and
   storing the duplicate intra-coded frames, whether encrypted under the second encryption algorithm or unencrypted, in a third file;
   sending normal play content to a receiver compatible with the first encryption algorithm by multiplexing content from the first file with content from the second file,
   sending trick play content to a receiver compatible with the first encryption algorithm by retrieving content only from the second file;
   sending normal play content to a receiver compatible with the second encryption algorithm by multiplexing content from the first file with content from the third file,
   sending trick play content to a receiver compatible with the second encryption algorithm by retrieving content only from the third file;
   whereby, separate trick play files and multiple encrypted content files are combined.

2. The method according to claim 1, wherein the digital content comprises MPEG encoded digital content, and wherein the intra-coded frames comprise I-frames, and wherein the inter-coded frames comprise B-frames and P-frames.

3. The method according to claim 1, further comprising:
   receiving a request from a subscriber terminal for the digital content;
   determining whether the subscriber is enabled for decryption of content under the first encryption algorithm or the second encryption algorithm in order to determine which of the second and third files to use for sending normal play content and trick play content.

4. The method according to claim 3, wherein the content is retrieved from the first and third files in an order of sequential frames in the content for normal play content for a receiver compatible with the second encryption algorithm, and wherein the content is retrieved from the first and second files in an order of sequential frames in the content for normal play content for a receiver compatible with the first encryption algorithm.

5. The method according to claim 1, wherein the digital content comprises MPEG encoded digital content, and wherein the intra-coded frames comprise I-frames, and wherein the inter-coded frames comprise B-frames and P-frames.

6. An apparatus for processing digital video content, wherein the digital video content comprises intra-coded frames and inter-coded frames, the method comprising:
   an encryption processor that duplicates the intra-coded frames and selects a plurality of the intra-coded frames for encryption to produce selected frames;
   a first encrypter for encrypting the selected frames under a first encryption algorithm to produce first encrypted frames;
   a second encrypter for encrypting the duplicates of the selected frames under a second encryption algorithm to produce second encrypted frames;
   a file server that stores the inter-coded frames in a first file;
   the file server further storing the intra-coded frames, whether encrypted under the first encryption algorithm or unencrypted, in a second file;
   the file server further storing the intra-coded frames, whether encrypted under the second encryption algorithm or unencrypted, in a third file;
   a session manager that receives a request from a subscriber terminal for the digital content, the session manager further determining whether the the subscriber is enabled for decryption of content under the first encryption algorithm or the second encryption algorithm;
   a multiplexer operating under control of the session manager, the multiplexer operating to retrieve content from the file server to:
      send normal play content to a receiver compatible with the first encryption algorithm by multiplexing content from the first file with content from the second file,
      send trick play content to a receiver compatible with the first encryption algorithm by retrieving content only from the second file;
      send normal play content to a receiver compatible with the second encryption algorithm by multiplexing content from the first file with content from the third file; and
      send trick play content to a receiver compatible with the second encryption algorithm by retrieving content only from the third file; and
   a transmitter that sends the content from the multiplexer to the subscriber terminal.

7. The apparatus according to claim 6, wherein the content is retrieved from the first and third files and the first and second files in an order of sequential frames in the content.

8. The apparatus according to claim 6, wherein the digital content comprises MPEG encoded digital content, and wherein the intra-coded frames comprise I-frames, and wherein the inter-coded frames comprise B-frames and P-frames.

* * * * *